United States Patent
Boudnik et al.

(10) Patent No.: US 7,165,256 B2
(45) Date of Patent: Jan. 16, 2007

(54) TASK GROUPING IN A DISTRIBUTED PROCESSING FRAMEWORK SYSTEM AND METHODS FOR IMPLEMENTING THE SAME

(75) Inventors: Konstantin I. Boudnik, Santa Clara, CA (US); Weiqiang Zhang, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 745 days.

(21) Appl. No.: 10/025,900

(22) Filed: Dec. 19, 2001

(65) Prior Publication Data

US 2003/0120700 A1 Jun. 26, 2003

Related U.S. Application Data

(63) Continuation-in-part of application No. 09/953,223, filed on Sep. 11, 2001.

(51) Int. Cl.
  G06F 9/46 (2006.01)
  G06F 15/16 (2006.01)
  G06F 9/44 (2006.01)
  G06F 11/00 (2006.01)

(52) U.S. Cl. ............... 718/104; 718/100; 718/102; 709/223; 709/224; 709/225; 709/226; 717/124; 717/127; 714/25; 714/31; 714/38

(58) Field of Classification Search ........ 718/100–108; 709/219–226, 227; 712/211, 242; 714/38, 714/25, 31; 717/124, 127
  See application file for complete search history.

(56) References Cited

U.S. PATENT DOCUMENTS 4,800,521 A * 1/1989 Carter et al. ............... 718/102

5,325,525 A * 6/1994 Shan et al. ................. 718/104

(Continued)

FOREIGN PATENT DOCUMENTS

EP 0 892 530 A 1/1999

(Continued)

OTHER PUBLICATIONS

Arnold, "The Jini Architecture: Dynamic Services In a Flexible Network", *ACM* (1999) pp. 1-6.

(Continued)

Primary Examiner—Meng-Al T. An
Assistant Examiner—Jennifer N. To
(74) Attorney, Agent, or Firm—Martine Penilla & Gencarella, LLP

(57) ABSTRACT

A method for executing processing tasks in a distributed processing framework system is provided. The method includes identifying a main task of a tasklist and identifying a subtask of the main task. Also included is allocating computing resources for each of the main task and the subtask. The method further includes deploying the main task to a first computing system that is part of the distributed processing framework system. A code of the main task is executed on the first computing system. The code of the main task has program instructions for requesting loading of code for the subtask to a second computing system. The second computing system is part of the allocated computing resources. The code for the subtask is in client-server communication with the code for the main task, such that the code for the main task receives processing results directly from the code for the subtask.

20 Claims, 13 Drawing Sheets

U.S. PATENT DOCUMENTS

| | | | | |
|---|---|---|---|---|
| 5,371,883 | A * | 12/1994 | Gross et al. | 714/38 |
| 5,524,253 | A | 6/1996 | Pham et al. | 709/202 |
| 5,742,754 | A * | 4/1998 | Tse | 714/38 |
| 5,854,889 | A | 12/1998 | Liese et al. | 714/43 |
| 5,896,495 | A | 4/1999 | Stein et al. | 714/38 |
| 5,925,102 | A | 7/1999 | Eilert et al. | 709/226 |
| 5,948,065 | A | 9/1999 | Eilert et al. | 709/226 |
| 6,009,454 | A * | 12/1999 | Dummermuth | 718/108 |
| 6,058,393 | A | 5/2000 | Meier et al. | 707/10 |
| 6,081,826 | A * | 6/2000 | Masuoka et al. | 718/100 |
| 6,112,243 | A * | 8/2000 | Downs et al. | 709/226 |
| 6,216,158 | B1 | 4/2001 | Luo et al. | 714/38 |
| 6,360,268 | B1 * | 3/2002 | Silva et al. | 709/227 |
| 6,574,628 | B1 | 6/2003 | Kahn et al. | 707/10 |
| 6,662,217 | B1 | 12/2003 | Godfrey et al. | 709/219 |
| 6,697,967 | B1 | 2/2004 | Robertson | 714/43 |
| 6,708,324 | B1 * | 3/2004 | Solloway et al. | 717/124 |
| 6,711,616 | B1 * | 3/2004 | Stamm et al. | 709/226 |
| 6,754,701 | B1 | 6/2004 | Kessner | 709/219 |
| 6,757,262 | B1 | 6/2004 | Weisshaar et al. | 370/310 |
| 6,961,937 | B1 * | 11/2005 | Avvari et al. | 718/104 |
| 6,983,400 | B1 * | 1/2006 | Volkov | 714/38 |
| 7,032,133 | B1 * | 4/2006 | Lang et al. | 714/33 |

OTHER PUBLICATIONS

Edwards, W. K., "Core JINI", *Prentice Hall Ptr.*, Indianapolis, US, Jun. 1999, pp. 64-83, XP002265323 and XP002265392; pp. 136-163, XP002302486; and pp. 297, 305-320, 329, XP002212134.

Pagurek, B., et al., "Management of Advanced Services in H.323 Internet Protocol Telephony", *Proceedings IEEE Infocom 2000. The Conference on Computer Communications. 19th Annual Joint Conference of the IEEE Computer and Communications Societies. Tel Aviv, Israel, Mar. 2000, Proceedings IEEE Infocom.*, vol. 3 of 3, Conf. Mar. 2000, pp. 91-100, XP001004237, ISBN: 0-7803-5881-3, pp. 92 and 94.

Paulson, D., "JIVI Project: JINI-Based Intranet Virtual Instruments", *JIVI Project Information*, May 2000, pp. 1-3, XP002302376, URL:http://jivi/jini.org/, retrieved on Oct. 25, 2004.

Sommers, "Activatable Jini Services: Implement RMI Activation", *IBM*, Oct. 24, 2000, pp. 1-12.

Sun Microsystems: "Jini™ Device Architecture Specification" Sun Community Resources, 'Online! Jan. 25, 1999, XP002265322, retrieved from the Internet: <URL:http://wwws.sun.com/software/jini/specs/jini101specs/jini-spec.html>, retrieved on Dec. 16, 2003, paragraphs 01-01.1, and paragraphs 02.1-02.4.

Sun Microsystems: "Jini™ Architectural Overview", Sun Technical Whitepapers, 'Online! Jan. 1999, XP002266391, Retrieved from the Internet: <URL:http://wwws.sun.com/software/jini/whitepapers/architecture.html>, retrieved on Jan. 7, 2004, paragraphs 0001-0002.

\* cited by examiner

TASK GROUPING IN A DISTRIBUTED PROCESSING FRAMEWORK SYSTEM AND METHODS FOR IMPLEMENTING THE SAME

CROSS REFERENCE TO RELATED APPLICATIONS

This application is a continuation-in-part of U.S. patent application Ser. No. 09/953,223, filed Sep. 11, 2001, and entitled "DISTRIBUTED PROCESSING FRAMEWORK SYSTEM," which is incorporated herein by reference in its entirety.

BACKGROUND OF THE INVENTION

1. Field of the Invention

The present invention relates generally to software processing, and more particularly, to methods and systems for grouping a plurality of tasks for execution by a plurality of processing resources.

2. Description of the Related Art

As the use of software in performing daily tasks is increasing rapidly, assessing software reliability through software testing has become an imperative stage in software development cycle. As is well known, software testing is used to find and eliminate defects (i.e., bugs) in software, which if undetected, can cause the software to operate improperly. In general, software testing may be performed by implementing a stand-alone computer or a network of computer resources. Typically, when a test is executed by a stand-alone computer, the software user must manually program the stand-alone computer system to run the test. That is, to submit a new test, modify or terminate an existing test, obtain the status of the tests currently running, or view or analyze test results, the software user must be able to physically access the computer lab and the stand-alone computer system. In doing so, the software user must manually start the execution of each of the tasks.

Comparatively, when a network of computer resources is used, the users are responsible for manually adding and deleting the computer resources to the network, programming the master computer system and the server, initiating the running of a user-selected test, running the test on the group of dedicated computer systems coupled to the server, storing and maintaining the text or Hyper Text Markup Language (hereinafter, "HTML") files containing the test results, viewing the test result files, and analyzing the test results. Again, to perform any of these tasks, a user must have physical access to each of the dedicated computer systems and must manually initiate the running of each of the tasks. Additionally, all of the tasks are initiated separately and simultaneously using the system console. As a result, the network of the computer resources is very inflexible, as it treats all tasks similarly and runs all tasks concurrently irrespective of the nature of each task.

Additionally, in either scenario, a heavy user interface is required for initiating the software testing on the master computer, scheduling the running of specific tests on the system resources, adding and deleting of the system resources, keeping track of the system resources and their respective hardware and software configuration, and maintaining the system resources. Moreover, in either case, the software testing is performed by dedicated system resources. That is, the system resources are designed to solely be used for software testing.

In view of the foregoing, there is a need for a flexible methodology and system capable of grouping a plurality of tasks having similar or different processing orders for execution by different computer resources.

SUMMARY OF THE INVENTION

Broadly speaking, the present invention fills these needs by providing a flexible method and apparatus for grouping an execution of a group of tasks by a plurality of local/remote processing resources. In one embodiment, a plurality of tasks within each group of tasks may be configured to have similar/different execution orders. In one example, each group of tasks may be configured to be processed in a shuffle, a concurrent, or a sequential execution order. It should be appreciated that the present invention can be implemented in numerous ways, including as a process, an apparatus, a system, a device, or a method. Several inventive embodiments of the present invention are described below.

In one embodiment, a method for executing processing tasks in a distributed processing framework system is disclosed. The method includes identifying a main task of a tasklist and identifying a subtask of the main task. Also included is allocating computing resources for each of the main task and the subtask. The method further includes deploying the main task to a first computing system that is part of the distributed processing framework system. A code of the main task is executed on the first computing system. The code of the main task has program instructions for requesting loading of code for the subtask to a second computing system. The second computing system is part of the allocated computing resources. The code for the subtask is in client-server communication with the code for the main task, such that the code for the main task receives processing results directly from the code for the subtask.

In another embodiment, a method for distributing an execution of a plurality of tasks within a tasklist by a system controller is disclosed. The plurality of tasks are configured to be processed by a plurality of processing resources in a distributed processing framework (DPF) system. The method includes loading the tasklist having a main task and a subtask. Also included are allocating a processing resource to execute each task within the tasklist and deploying the main task for execution. The method further includes deploying the subtask to the processing resource upon receiving a special request for the subtask from the main task. Also included is enabling communication between the main task and the subtask. The communication provides the main task with a result of a subtask execution.

In yet another embodiment, a method for distributing an execution of a plurality of tasks by a system controller is disclosed. The plurality of tasks are configured to be processed by a plurality of processing resources in a distributed processing framework (DPF) system. The method includes loading a plurality of tasks to be executed and allocating a processing resource to execute each of the plurality of tasks. Also included is deploying each task to a respective processing resource substantially at the same time. The method further includes receiving a result task from each processing resource upon a conclusion of each task. Also included in the method is releasing the plurality of processing resources upon receiving a result of an execution from each of the plurality of processing resources.

In still another embodiment, a method for distributing an execution of a plurality of tasks by a system controller is disclosed. The plurality of tasks are configured to be processed by a plurality of processing resources in a distributed processing framework (DPF) system. The method includes loading a plurality of tasks to be executed and allocating a processing resource to execute each of the plurality of tasks. Also included is deploying a first task of the plurality of tasks to a first processing resource of the plurality of processing resources. The method further includes deploying a second task of the plurality of tasks to a second processing resource of the plurality of processing resources upon receiving a result of an execution of the first task. Also included is releasing the plurality of processing resources upon receiving a result of an execution for each of the plurality of tasks.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
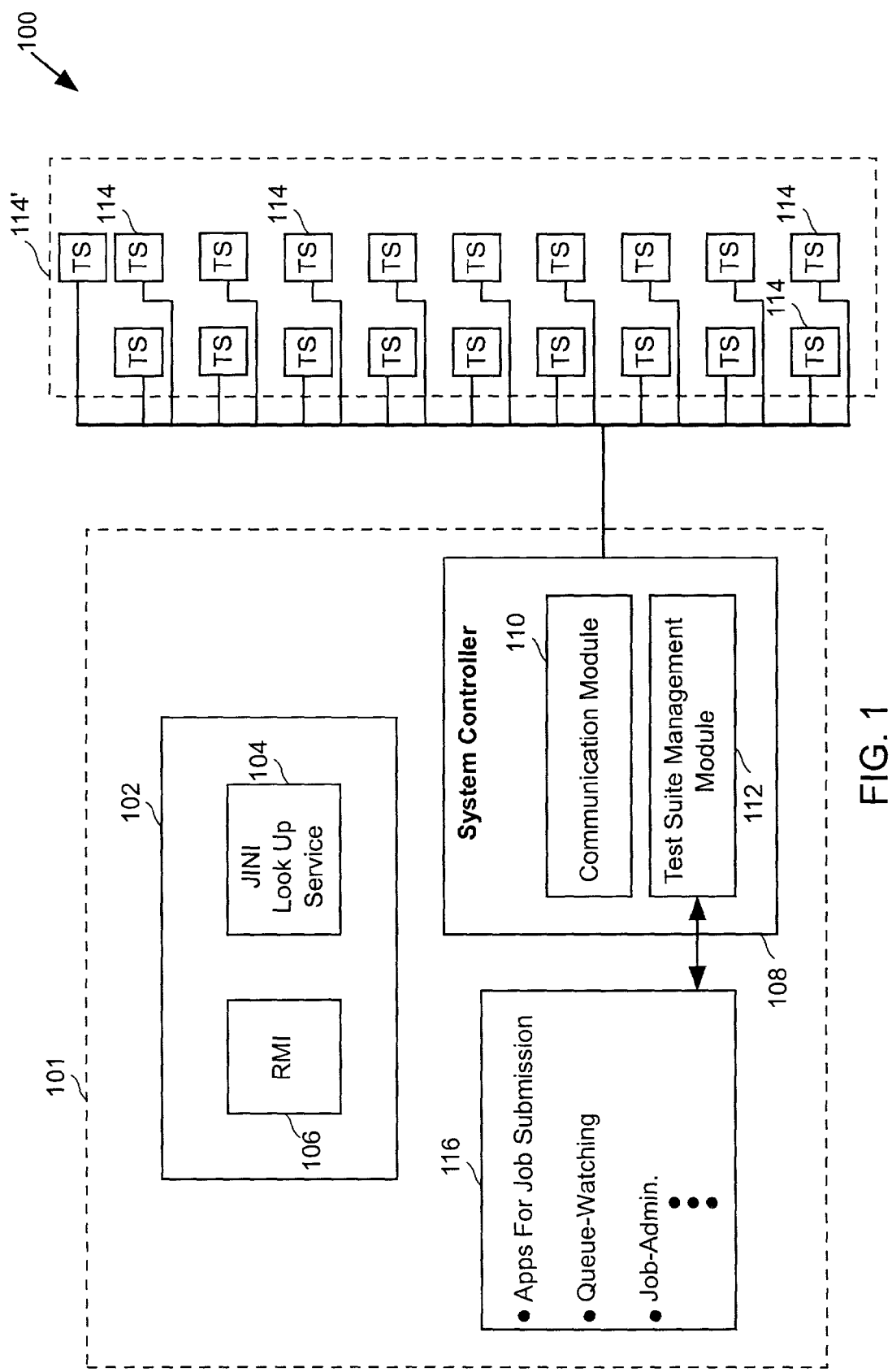
FIG. 1 is a block diagram illustrating a distributed test framework (DTF) system, in accordance with one embodiment of the present invention.

Inventions for grouping a set of tasks each having a processing order for execution by a plurality of processing resources in a distributed processing framework (DPF) system and methods for implementing the same are disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

As an overview, the task grouping of present invention provides a flexible method and system to process a plurality of tasks each having a processing order. In one example, the processing of a tasklist including a plurality of tasks is assigned to a plurality of processing resources. For instance, the plurality of tasks in the tasklist may be processed in a shuffle execution order, concurrent execution order, or sequential execution order. As used herein, shuffle execution order refers to deployment of a subtask by the system controller for execution upon receiving a special request from a main task running on a processing resource; the term sequential execution order refers to deployment of a task for execution by the system controller upon receiving a result of an execution of a previously deployed task; and the term concurrent execution order refers to substantially simultaneous deployment of a plurality of subtasks by the system controller for execution by a plurality of processing resources substantially at the same time.

In the shuffle execution order, the tasklist includes a main task and a plurality of subtasks, each having a plurality of attributes. In one example, the main task and the subtasks are codes configured to run on a processing resource. In one implementation, the main task is deployed to a distributed processing server for processing. As used herein, a distributed processing server is any processing resource capable of executing a server code. The main task then dispatches a special request to the system controller requesting the deploying of a subtask having a similar attribute. The system controller then locates and deploys the selected subtask to a processing resource client while the main task maintains a communication with the subtask being processed. As used herein, the processing resource client can be any processing resource capable of processing a client code. As designed, a client-server relationship exists between the main task and each of the subtasks. Upon conclusion of processing of the subtask, the subtask provides the main task with a feedback, which in turn is communicated to the system controller. In this manner, a set of tasks, each having different processing orders, can be executed together.

Comparatively, in a concurrent execution order, a plurality of tasks are deployed to a plurality of processing resources for processing substantially concurrently. In a sequential method, a task is deployed to a processing resource for execution. Thereafter, the system controller awaits receiving the results of task execution. Upon receiving the results of the execution of the first task, the system controller is configured to deploy a second task in the taskqueue as it awaits prosecution.

In one example, the distributed processing framework (DPF) system is designed to manage the execution of a process utilizing cross-platform dynamically networked distributed computer systems. The DPF has the capability to intelligently select and utilize computer systems of an ad-hoc network of distributed computer systems having either the same or different software/hardware configuration to execute a process. As used herein, an "ad-hoc" or a "dynamic" network is defined as a network in which the computer resources may be part of the network temporarily and for a specific length of time (i.e., spontaneous). In one example, the DPF system implements the Jini™ (hereinafter "Jini") technology to provide spontaneous interaction between its components. In this manner, the computer systems attach to and detach from the ad-hoc network of processing resources (e.g., computer resources) without disturbing the DPF system. Accordingly, the computer resources are not limited to executing processes submitted to the DPF system of present invention.

In one exemplary embodiment, the DPF system is a distributed test framework (DTF) system configured to manage test suite execution on cross-platform dynamically networked computer systems. In one implementation, the DTF system includes a server computer system and a plurality of ad-hoc network of processing resources configured to spontaneously interact implementing the Jini technology. The server computer system is configured to include a Jini look up service and a system controller configured to manage the processing of the submitted test suites. In one instance, the plurality of computer resources join the Jini look up service registering their respective proxies and corresponding attributes. In one example, the system controller searches the look up service for an available suitable computer resource to process each of the submitted test suites. Once a computer resource is selected to run the test suite, the machine service component of the selected computer resource spawns a second service (e.g., process service) to execute the test suite. The DTF system includes a system controller configured to schedule, distribute, and manage a plurality of test suites being executed. In one embodiment, the system controller is configured to include a communication module and a test suite management module. The management module is responsible for managing the processing of a submitted process while the communication module designed to manage the communication between the system controller and the distributed processing resources.

In one exemplary embodiment, the system controller registers with a registry service (e.g., a look up service) allowing the plurality of user computer systems to locate the system controller, requesting a copy of the data center. Upon receiving such request, a copy of the data center is provided to the user computer system thus enabling the user to access the data in the data center. In one example, the system controller maintains the copies of the data center synchronized implementing a refresh command.

The system controller implemented in the DTF system is further configured to have the capability to intelligently select and utilize computer resources of the ad-hoc network of distributed computer resources having either the same or different software/hardware configuration to execute a process. As used herein, an "ad-hoc" or a "dynamic" network is defined as a network in which the processing resources may be part of the network temporarily and for a specific length of time (i.e., spontaneous). In one example, the system controller of the present invention is implemented in the DTF system and uses the Jini™ (hereinafter "Jini") technology to provide spontaneous interaction between its components. In this manner, the processing resources attach to and detach from the ad-hoc network of computer resources without disturbing the DTF system. Accordingly, the system controller has the capability to manage the process being executed by a plurality of processing resources not solely limited to executing processes submitted to the DTF system.

In one implementation, the DTF system includes a server computer system and a plurality of ad-hoc network of resources configured to spontaneously interact implementing a device registry. The server computer system is configured to include the device registry (e.g., Jini look up service) and the system controller configured to manage the processing of the submitted test suites. In one instance, the plurality of test systems join the Jini look up service by registering their respective proxies and corresponding attributes. In one example, the system controller searches the look up service for an available and suitable test system to process each of the submitted test suites. Once a test system is selected to run the test suite, the machine service component of the selected computer resource spawns a second service to execute the test suite.

As one embodiment of the present invention implements the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service on a network. As used herein, registering a service is defined as sending the service proxy to all look up services on the network or a selected subset of the look up services. By way of example, the look up service is equivalent to a directory or an index of available services wherein the proxies for each of the services and their associated code are stored. When a service is requested, the proxy associated with the requested service is sent to the requesting client, thus enabling the client to use the requested service. Once dispatched, the proxy is configured to conduct all communication between the client and the Jini service.

In providing an ad-hoc network of computers, in one embodiment, Jini introduces a concept called "leasing." That is, once a service joins the Jini network, the Jini service registers its availability for a certain period of leased time. This lease period may be renegotiated before the lease time is expired. When a service leaves the Jini network, the service entry in the look up service is removed automatically once the service's lease is expired. For further details on Jini technology, please refer to K. Arnold et al., The Jini Specification (1999) and W. Keith Edwards, Core Jini (1999).

As Jini is implemented in the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and Intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping these brief overviews to Jini and Java as they relate to the present invention in mind, reference is now made to FIG. 1 illustrating a block diagram of a distributed test framework (DTF) system 100, in accordance with one embodiment of the present invention. As shown, physically, the DTF system 100 includes two groups of computer systems: (1) a system server group 101, and (2) a test system group 114'. The system server group 101 includes a service component 102 and a system controller 108. The service component 102 is configured to contain a Jini look up service 104 and a Remote Method Invocation (RMI) 106. In one embodiment, the RMI is designed to handle various communication needs. Comparatively, the Jini look up service 104 is a dedicated process running on the master computer system, server, and is configured to function as a central registry. As used herein, the master computer system is defined as the computer system running the system controller 108. As designed, in one embodiment, the master computer is configured to include both the system controller 108 and the service component 102. However, in a different implementation, each of the system controller 108 and the service component 102 may be included and run by separate computer systems. As designed, the look up service 104 is configured to enable the system controller 108 to locate available computer systems of an ad-hoc network of computer systems to execute a given test execution request using the test system registerable attributes. For instance, the look up service 104 includes registerable attributes, which identify the test machine platform, operating system, and other software and hardware characteristics.

The illustrated system controller 108 includes a data center component 109 and a user interface component 111. Broadly speaking, the user interface 111 is utilized to interact with the user computer systems. For instance, in one example, a user computer system interacts with the system controller by obtaining instances of the user interface component. The data center component 109 of the remote system controller 108 is configured to include substantially all data required to execute a test suite. By way of example, a sample data center may include data such as, the number of test execution requests currently being processed or waiting to be processed, the number of test systems available to execute a certain type of a test suite, the status of the test suites being executed, etc.

As shown, in one embodiment, the illustrated system controller 108 includes a communication module 110 and a test suite management module 112. The communication module 110 manages the communication between the system controller 108 and the distributed test systems 114. For instance, the communication module 110 is responsible for locating available test systems 114, running test execution requests, and gathering information regarding the status of the test systems 114. In one example, the system controller 108 manages the communication with the distributed test systems 114 by implementing a plurality of threads. In this manner, the system controller 108 has the capability to communicate with a plurality of test systems 114 in parallel. However, it must be noted that in a different embodiment, the system controller 108 may implement any suitable mechanism to manage the communication between the system controller 108 and the distributed test systems 114 (e.g., Jini, RMI, Transport Commit Protocol/Internet Protocol (TCP/IP) sockets, etc.).

The test suite management module 112 is responsible for managing the processing of the submitted test suites and the test execution requests. As used herein a test suite is a comprehensive list of data files having commands specifically programmed to initiate a number of functional aspects of the software product being tested. For instance, if the software product being tested is a word processing program, the test suite may activate a spell check command, a cut test command, a paste command, etc. Thus, once the test suite is executed, the test results reveal whether any of the tested commands failed to operate as intended. Also as used herein, once submitted for processing, each test suite becomes a "test execution request." As the processing of different portions of the test suite can be assigned to different test machines, the test suites may be divided into a plurality of test execution requests (i.e., jobs).

By way of example, the test suite management module 112 maintains an inqueue directory designed to include almost all the submitted test execution requests. Once the system controller 108 is initiated, the system controller 108 is configured to read each test execution request from files held in the inqueue directory. Once a test execution request is read, it is put into either a wait queue configured to hold test execution requests waiting to be executed or an execution queue designed to hold test execution requests currently being executed. Further information regarding managing the inqueue directory, wait queue, and execution queue will be provided below. As illustrated, in one example, the test suite management module 112 is configured to manage the software applications and user interfaces implemented for job submission, queue watching, job administration, etc., as shown in 116.

The test system group 114' includes a plurality of test systems 114 having similar or diverse hardware and software configuration. Although shown as a group, the test systems 114 are not necessarily limited to testing. In fact, the test systems 114 can be computers or systems used by employees of a company for normal desktop work. So long as the test systems 114 are associated with the networked group, the processing power of these test systems 114 can be used. In one embodiment, the test systems 114 can be used during normal working ours when the test systems 114 are running, for example, business applications, or during off hours, thus tapping into potentially huge processing resources that would otherwise be left unused. It should therefore be appreciated that test systems 114 do not necessarily have to be solely dedicated to testing or processing for the system server group 101.

In one embodiment, the test systems 114 are configured to execute the test execution requests dispatched by the system controller 108. Each of the test systems 114 runs an agent process (not shown in this Figure) designed to register the respective test system 114 with the Jini look up service 104. In this manner, the agent process for each test system 114 advertises the availability of the associated test system 114. As will be discussed in further detail below, a machine service component of the agent is used to establish communication between the associated test system 114 and the system controller 108. Specifically, by implementing the Jini attributes, the machine service registers the test system 114 characteristics with the Jini look up service 104. The test system 114 attributes are subsequently used by the system controller 108 to locate a test system 114 suitable to execute a specific test execution request.

While the DTF system 100 can physically be divided into two groups, logically, the DTF system 100 is comprised of three over all parts: (1) Job submission and other user interfaces; (2) Test scheduler and system controller; and (3) Test execution on remote or local systems.

For the most part, the job submission and other user interfaces component is a job queuing system having a variety of applications and user interfaces. As designed, the job submission component is configured to perform several tasks such as handling job submission, managing queues, administrating jobs, and administrating the ad-hoc network of the distributed test systems.

By way of example, in one implementation, the user interface may be as follows:

Launch system controller: In one embodiment, launching the system controller 108 is performed by running an appropriate shell script. As designed, the shell script is configured to launch the Jini and RMI support servers.

Kill system controller: Finds substantially all the processes, and once found kills each of the processes, individually.

Submit jobs: Before the system controller 108 is launched, an Extensible Markup Language (XML) formatted test-execution-request file is created in the inqueue directory (e.g., that is preferably part of the test suite management module). In this manner, once the system Controller 108 is launched, the system controller 108 scans the inqueue directory, thus entering almost each and every test execution request into the in-queue (the in-queue being an actual queue, as contrasted with the inqueue directory).

Check queue: In one embodiment, a stopgap Graphical User Interface (GUI) is provided.

Cancel/administer a job: In one implementation, a stopgap GUI is implemented.

Other administrative tasks: In one exemplary embodiment, additional user interfaces are included. For instance, in certain cases, the system controller 108 is configured to implement various input files.

The second logical component, the test scheduler and system controller, includes the system controller 108 configured to perform the function of managing the job queues and dispatching the test execution requests to test system 114 for processing. Thus, the system controller 108 is configured to manage both; the wait queue (i.e., the queue containing the test execution requests waiting to be executed) and the execution queue (i.e., the queue containing test execution requests currently being executed). In one embodiment, the in-queue is analogous to the wait queue.

As designed, the test scheduler and system controller component is configured to include four modules:

Suite MGR: This module maintains a list of the available test suites stored in a known location in the file system. As designed, the test suite descriptions are stored in an XML formatted file in a suite directory.

Log MGR: This module is configured to handle the logging of activities inside the system controller 108 by implementing a plurality of log files having XML format. For instance, this is particularly useful for debug tracing and system statistics charting.

Queue MGR: This module is designed to maintain the two queues, wait queue (i.e., the in-queue) and the execution queue. Specifically, while a job is in any of the queues, an XML formatted file is kept in the queue directory reflecting the current status of the job. Each test execution request is configured to have a list of attributes describing the system characteristics required to execute the test execution request.

Scheduler: This module is configured to manage the dispatch of the test execution requests from the wait queue to the execution queue. In one embodiment, a job is dispatched when (a) the time to execute the job has been reached, and (b) a test system 114 having the required characteristics is available to execute the job.

In accordance with one implementation, the requirements for a DTF system are provided below in Table 1.

TABLE 1

Client-Server Test Frame Requirements

| Requirements | | Accessments | Notes |
|---|---|---|---|
| Tool Requirements (e.g., javatest, jtreg, tonga, shell, etc.) | | Green | |
| Test Execution Requirements | Clean Environment | Green | |
| | Setup | Green | |
| | Execute test suite | Green | |
| | Post-processing | Red | In one example, there are no post actions. |
| | Get test results | Green | |
| | Clean Environment | Green | |
| Other Requirements | | | |
| Error Handling | Crashing | Yellow | In one example, a method is implemented to stop the system. |
| | Hanging | Yellow | |
| Notification (When done) | | Green | |
| Machine Requirements (MKS, Patches) | | Green | |
| Test Suites Available | | Yellow | In one example, a suite path is passed through a plurality of command arguments |
| JDKs Available | | Yellow | In one embodiment, java.exe is in the path environment. |
| Machine Use Detection | | Red | |
| Queue Test Suites | | Red | |
| GUI Requirements | | | |
| Machine Characteristics Matrix | | Red | |
| Result Comparison | | Red | |
| Golden JDK results | | Red | |
| Stop/Destroy Test | | Green | |
| User Profiles/Managements | | Red | |
| Logs | | Green | |
| Test Result Notification | | Red | |
| Scheduling Test | | Red | |
| Machine Statistics (Idle time, Usage Profile) | | Red | |
| Error Recovery (Net Problems) | | Red | |
| Fault Tolerant | | Yellow | In one example, fault tolerant is performed by a plurality of actions based on coordination protocol, thus minimizing faults. |
| Scaleable | | Green | In one embodiment, test suites can be easily added or deleted. |
| Demon Requirements | Version # (Compatibility) | Red | |
| | Machine Descriptions | Yellow | In one example, Demon Requirements are the basic configurations (e.g., OS, version, etc.). |

Figure 2:
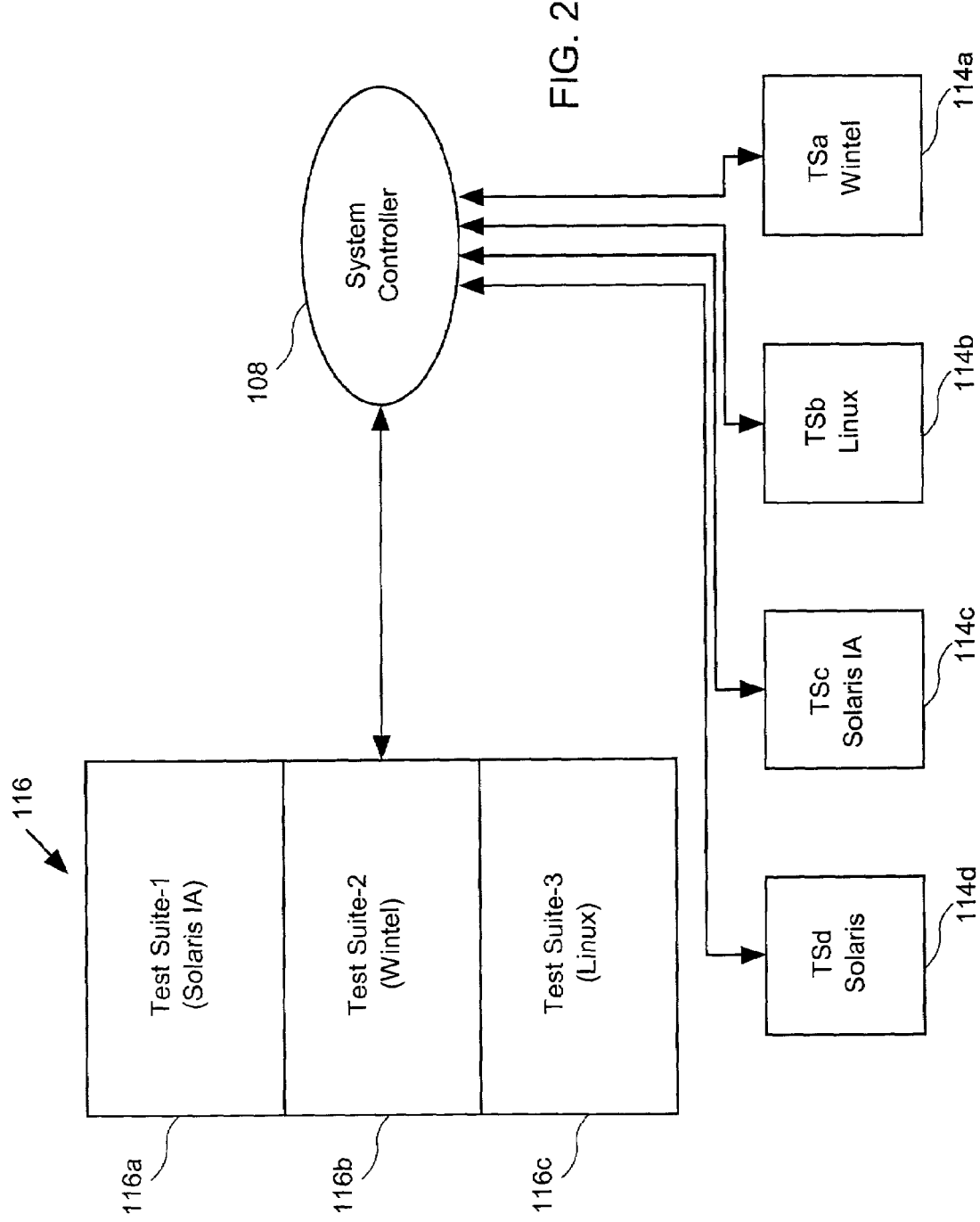
FIG. 2 is a block diagram illustrating the capability of the present invention to intelligently locate an available and suitable test system to execute a test suite, in accordance with another embodiment of the present invention.

Reference is made to a block diagram depicted in FIG. 2 wherein the capability of the DTF system to intelligently locate a test system 114 available to execute a test suite is illustrated, in accordance with one embodiment of the present invention. As shown, an inqueue directory 116 contains a plurality of test execution requests 116a, 116b, and 116c. In accordance with one embodiment of the present invention, once the system controller 108 is initiated, the system controller 108 is designed to read each test execution request 116a–116c contained within the inqueue directory 116. As shown, each test suite request 116a–116c must be executed by a test system 114 capable of running the test execution request requirements. For instance, each of the test execution requests 116a, 116b, and 116c must be run on a Solaris IA™ test system, a Wintel™ test system, or a Linux™ test system, respectively. As will be described in more detail below, the DTF system 100 has the capability to advantageously locate an available test system from a plurality of ad-hoc network of test systems 114a, 114b, 114c, and 114d to execute each of the test execution requests 116a–116c.

As shown in the embodiment depicted in FIG. 2, each of the test systems 114a–114d has a different software and hardware configuration. For instance, while the test system 114a is run on Wintel™ and the test system 114b is ran on Linux™, the test systems 114c and 114d are programmed to run on Solaris IA™ and Solaris™, respectively. As will be discussed in more detail below, the machine service for each test system 114a–114c registers the respective test system 114a–114c with the Jini look up service using the Jini attributes. Particularly, the embodiments of the present invention are configured to register the hardware and software configuration for each test system 114a–114d with the Jini look up service 104. In this manner, the system controller 108 can search the Jini look up service 104 implementing the test execution request requirements as search criteria. Thus, as shown in the example of FIG. 2, the system controller 108 of the present invention selects the test systems 114c, 114a, and 114b to execute the test suite requests 116a–116c, respectively.

Figure 3:
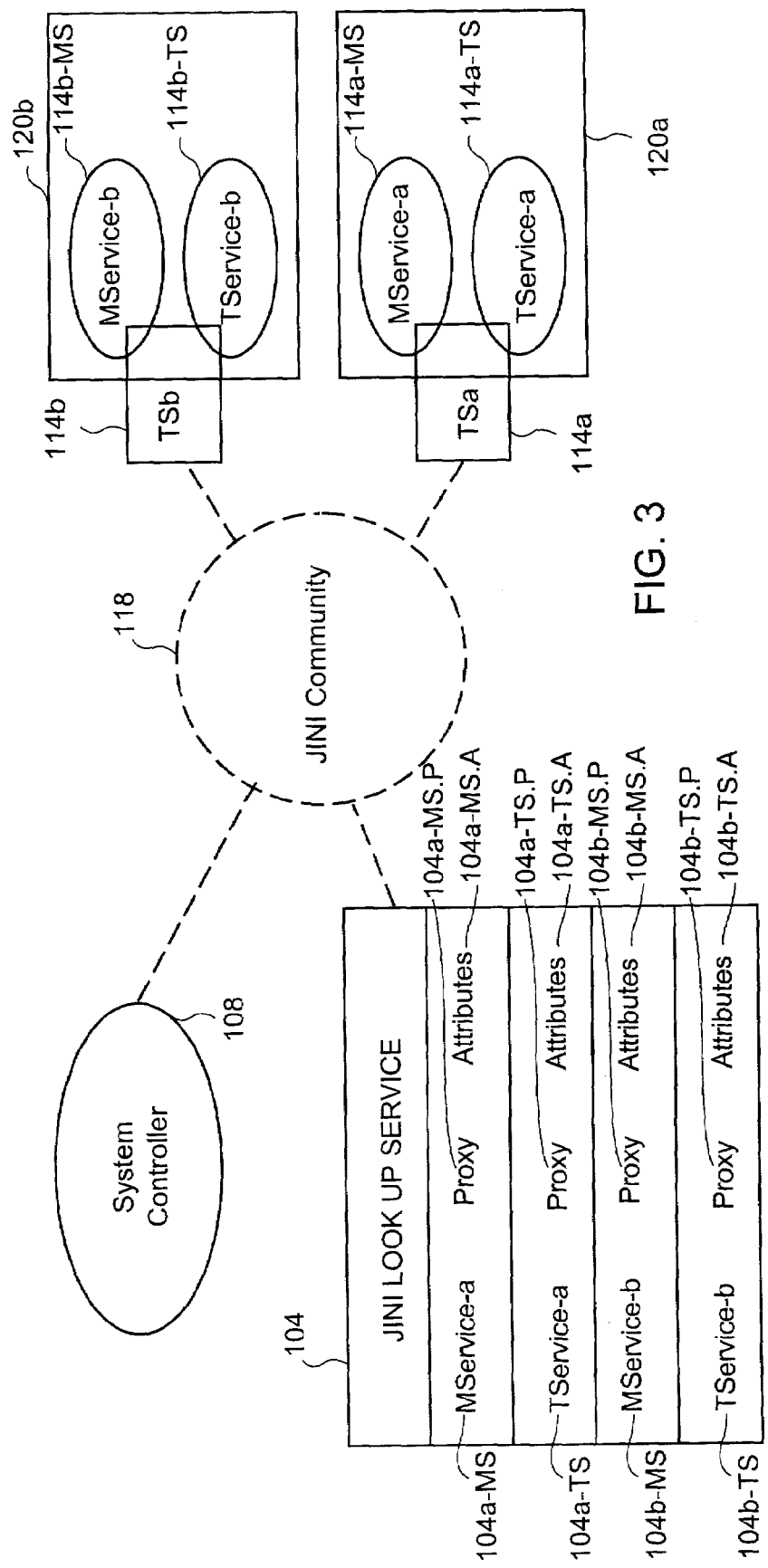
FIG. 3 is a block diagram illustrating the implementation of the test system attributes to locate a suitable test system to process a test execution request, in accordance with yet another embodiment of the present invention.

Implementing the test system attributes to locate a suitable test system to run a test execution request can further be understood with respect to the block diagram shown in FIG. 3, in accordance with one embodiment of the present invention. As shown, the test systems 114b and 114a, the system controller 108, and the Jini look up service 104 communicate to each other using Jini. In one example, the system controller 108, the Jini look up service 104, and the test systems 114a and 114b and all the other resources that are Jini enabled form a virtual Jini community 118.

As shown, the test system 114a runs an agent process 120a responsible for notifying the Jini look up service 104 of the existence and configuration of the test system 114a. In one example, the agent 120a is also designed to export a downloadable image of itself. Beneficially, the downloadable image allows the system controller 108 to ask the test system 114a to initiate running a test execution request while interacting with the test system 114a as the test execution request is being processed.

The illustrated agent 120a involves two Jini services, machine service 114a-MS and test service 114a-TS. The function of the machine service 114a-MS is to advertise the availability of the test system 114a, the characteristics of the test system 114a, and the ability of the test system 114a to launch a test execution request. Additionally, the machine service 114a-MS is designed to be present on the test machine 114a at all times. As such, the machine service 114a-MS is initiated on the test system 114a at the start-up time and is configured to remain active on the test system 114a until the test system 114a is shut down.

Comparatively, the test service 114a-TS is a module configured to encapsulate the test execution request. As designed, the test service 114a-TS is spawned by the machine service 114a-MS and is subsequently launched when the machine service 114a-MS receives a request to start running a test execution request from the system controller 108. Specifically, the new test service 114a-TS is spawned based on the test execution request type. By way of example, in one embodiment, the machine service 114a-MS spawns separate test systems 114a-TS when running Tonga-type, JCK-type, JTREG-type, and shell-type test suites. However, one having ordinary skill in the art must appreciate that in a different example, the machine services are configured to spawn other suitable test systems. As shown, similar to test system 114a, the test system 114b is configured to include an agent 120b designed to include a machine system 114b-MS and a test system 114b-TS.

As will be discussed in more detail below and as shown in the implementation of FIG. 3, the machine service 114a-MS and test service 114a-TS, respectively, register Jini attributes 104a-MS.A and 104a-TS.A of the test system 114a with the Jini look up service 104. For instance, in one embodiment, the sequence of events in registering the machine service 114a-MS and test service 114a-TS may be as follows: Once the test-system 114a discovers and joins the Jini community 118, the test service 114a-MS of the test system 114a registers with the Jini look up service 104. In this manner, the machine service 114a-MS registers a machine service proxy 104a-MS.P and the attributes 104a-MS.A of the machine service 114a-MS with the look up service 104. The Jini attributes 104a-MS.A are then used by the system controller 108 to locate a test service having attributes suitable to run the test execution request.

Once the test system 114a has been selected to run the test execution request, the machine service 114a-MS spawns a test service 114a-TS having the same type as the test execution request. As discussed above, the machine service 114a-MS is configured to spawn a matching test service 114a-TS for each test execution request type. For example, the test system 114a may have the attributes to run a Tonga test execution request and a JTREG type test execution request. In such a situation, the Jini look up service 104 will include two test services each running a different type of test execution request. As a consequence, when the processing of one type of test execution request has concluded, the test service 114a-TS having substantially the same type can be terminated. Thus, for the most part, the test service 104a-TS, 104a-TS.A, and 104-TS.P are designed to substantially exist while the test system 114a is running a test execution request. In this manner, the system controller 108 can determine whether the test system 114a is processing a test execution request. Specifically, this is achieved by the system controller 108 simply querying the Jini look up service 104 as to whether the test system 114a has an associated existing test service.

In addition to registering the attributes 104a-MS.A and 104a-TS.A, the machine service 114a-MS and the test system 114a-TS are configured to respectively register a corresponding machine service proxy 104-MS.P and a respective test service proxy 104-TS.P with the Jini look up service 104. As designed, the system controller 108 implements the machine service proxy 104-MS.P and the test service proxy 104-TS.P to communicate with the test system 114a. Particularly, once the system controller 108 has selected the test system 114a to run the test execution request, the system controller 108 downloads the machine service proxy 104-MS.P from the Jini look up service 104. Once the machine service proxy 104-MS.P is downloaded, the system controller 108 starts communicating with the machine service proxy 104-MS.P rather than communicating directly with the corresponding test system 114a or the machine service 114a-MS.

In a like manner, the test service proxy 104-TS.P is the communication channel between the system controller 108 and the test service 114a-TS. Thus, similar to the machine service 114a-MS, the system controller 108 downloads the test service proxy 104-TS.P from the Jini look up service 104. Thereafter, the system controller communicates with the test service proxy 104-TS.P as if communicating with the test system 114a or the test service 114a-TS. As shown, in the same manner, the machine service 114b-MS and test service 114b-TS register their respective machine service proxy 104b-MS.P and machine service attributes 104b-MS.A as well as the respective test service proxy 104b-TS.P and test service attributes 104b-TS.A with the Jini look up service 104.

Figure 4A:
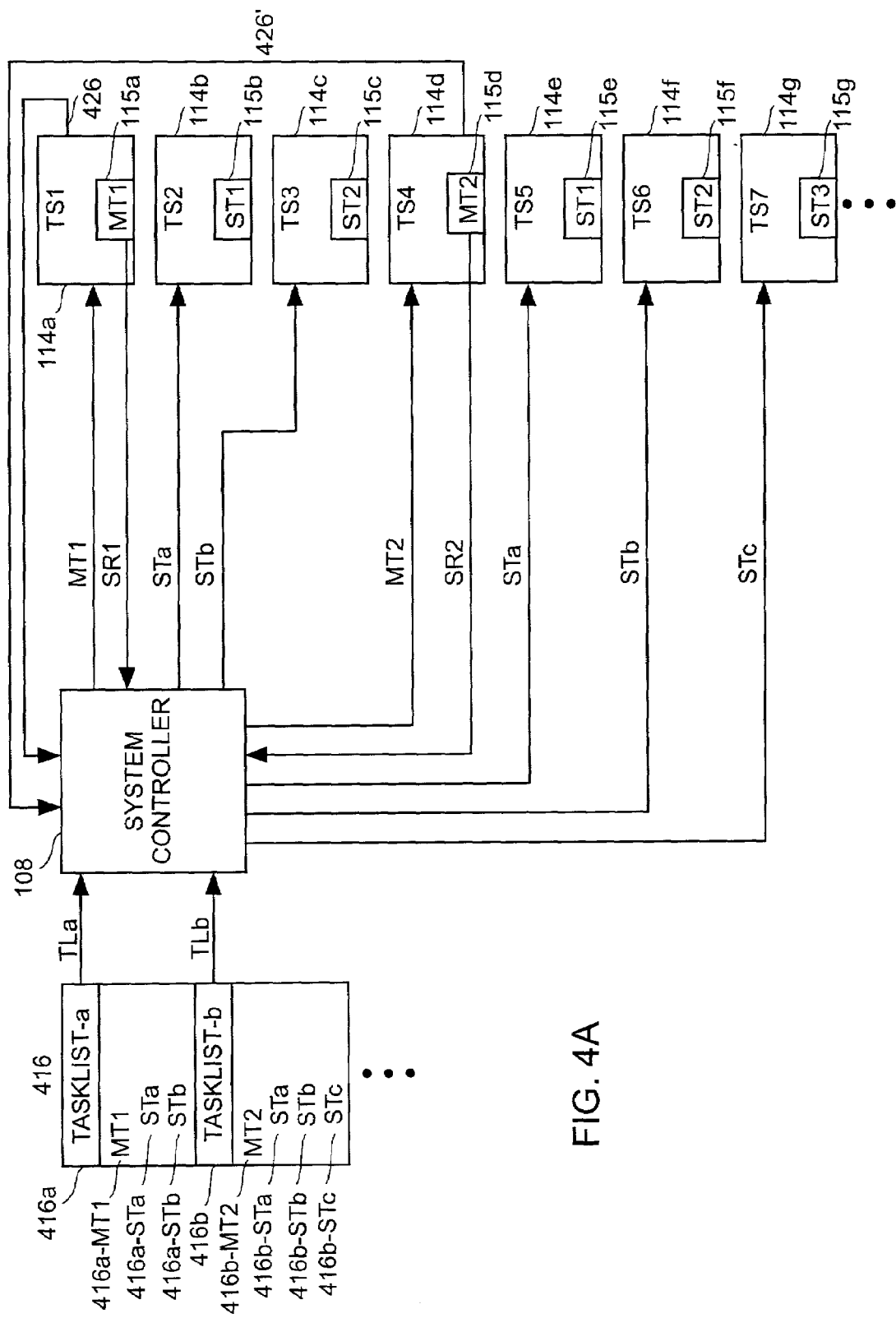
FIG. 4A is a block diagram illustrating the grouping of a plurality of tasks using a shuffle execution order, in accordance to yet another embodiment of the present invention.

The task grouping ability of the present invention is illustrated by way of the block diagram shown in FIG. 4A, in accordance with one embodiment of the present invention. As shown, the system controller 108 is configured to distribute the execution of each of a plurality of tasklists 416a–416b defined in the taskqueue 416 to a plurality of test systems 114a–114g. In one embodiment, as used herein a tasklist is comparable to a task request. However, as opposed to a test execution request, which includes a single test, a tasklist can be configured so as to include a single task or a plurality of tasks.

As shown in the embodiment of FIG. 4A, the taskqueue 416 contains a first tasklist 416a and a second tasklist 416b. The first tasklist 416a includes a main task 416a-MT1 and a plurality of subtasks 416a-STa and 416a-STb. The second tasklist 416b includes a plurality of subtasks 416b-STa, 416b-STb, and 416b-STc.

In accordance with one embodiment of the present invention, the main tasks 416a-MT1 and 416b-MT2 are either a test harness or a special application capable of designating the execution orders of each of the respective subtasks 416a-Sta, 416a–STb, 416b-STa, 416b-STb, and 416b-STc. That is, in accordance with the embodiments of the present invention, the main tasks 416a-MT1 and 416b-MT2 are configured to determine whether the subtasks are executed concurrently, sequentially, or shuffled.

In one embodiment, the look up service (not shown in this drawing), the system controller 108, and the plurality of the test systems 114a–114g are launched. Then, the system controller 108 reads the first tasklist 416a, determining the attributes of each test system required to execute the main task 416a-MT1 as well as the subtasks 416a-STa through 416a-STb. Upon making such determination, the system controller 108 is configured to communicate with the Jini look up service in an attempt to locate a corresponding test system having each of the required attributes. If the system controller 108 finds a corresponding test system to execute each of the tasks, the system controller 108 is configured to allocate the selected test systems for the execution of the tasks associated with the first tasklist. However, in one example, if the system controller 108 is incapable of locating a test system to execute each of the tasks within the first tasklist 416a, the system controller 108 can be designed to read the tasks contained within the second tasklist 416b and to allocate test systems for executing each of the tasks within the second tasklist 416b. In that scenario, once the system controller 108 has allocated the required number of test systems, the system controller 108 can be configured to return to the first tasklist 416a making a second attempt to allocate the appropriate number of test systems.

Upon allocating the necessary number of test systems 114a–114b to the execution of the tasks within the first tasklist 416a, the system controller 108 is configured to dispatch the main task 416a-MT1 to the test system 114a (i.e., the test system having a similar attribute as the main task 416a-MT1). Once the test system 114a receives the main task 115a, the test system 114a initiates the execution of the main task 115a. For instance, in one example, the main task 115a can be a test harness designed to initiate the execution of a plurality of subtasks on a plurality of remote tests systems. In accordance with one embodiment of the present invention, the main task 115a can be configured to execute subtasks 115b and 115c using concurrent, sequential, or shuffle execution order. However, as shown in the embodiment of FIG. 4A, the main task 115a has been designed to initiate the execution of the subtasks concurrently. That is the main task 115a is configured to initiate the execution of the subtasks 115b and 115c, concurrently, through dispatching a special request 424 to the system controller 108. By way of example, the main task 115a sends a special request 424 to the system controller requesting the subtasks 115b and 115c, each designed to have a specific attribute. As will be discussed in more details below with respect to FIG. 4B, in one instance, upon receiving the special request 424, the system controller 108 searches through the subtasks 416a-STa and 416a-STb to find the corresponding subtask (i.e., 416a-STa, and 416a-STb) contained within the tasklist 416a. Once the subtasks 416a-STa and 416a-STb have been located, the system controller 108 is configured to dispatch the subtasks 416a-STa and 416a-STb to the corresponding test systems 114b and 114c.

Once all the subtasks within the main task 115a have been requested and dispatched to the appropriate test system, the system controller 108 is configured to proceed to the next tasklist in the taskqueue 416 (e.g., 416b). Again, the system controller 108 reads the second tasklist 416b, the main task 416b-MT2, and the subtasks 416b-STa, 416b-STb, and 416b-STc. The necessary number of test systems 114d–115g are then found and allocated for execution of each of the main task 416b-MT2, and the subtasks 416b-STa, 416b-STb, and 416b-STc. The system controller 108 will then deploy the main task 416b-MT2 to the test system 114d having attributes similar to that of the main task. Once again, subsequent to initiation of the main task 115d, a special request 424' is dispatched by the main task 115d requesting the concurrent deployment of subtasks 115e, 115f, and 115g. Upon receiving the special request 424', the system controller 108 locates corresponding subtasks 416b-STa, 416b-STb, and 416b-STc and dispatches same to test systems 114e–114g, respectively.

As shown in the embodiment of FIG. 4A, the main tasks 115a and 115d are configured to dispatch task results 426 and 426' to the system controller for viewing and analysis. Furthermore, upon the conclusion of the execution of the main tasks and the subtasks, the test systems 114a–114c, and 114d–114g are released by the system controller 108 to execute different tasks.

Figure 4B:
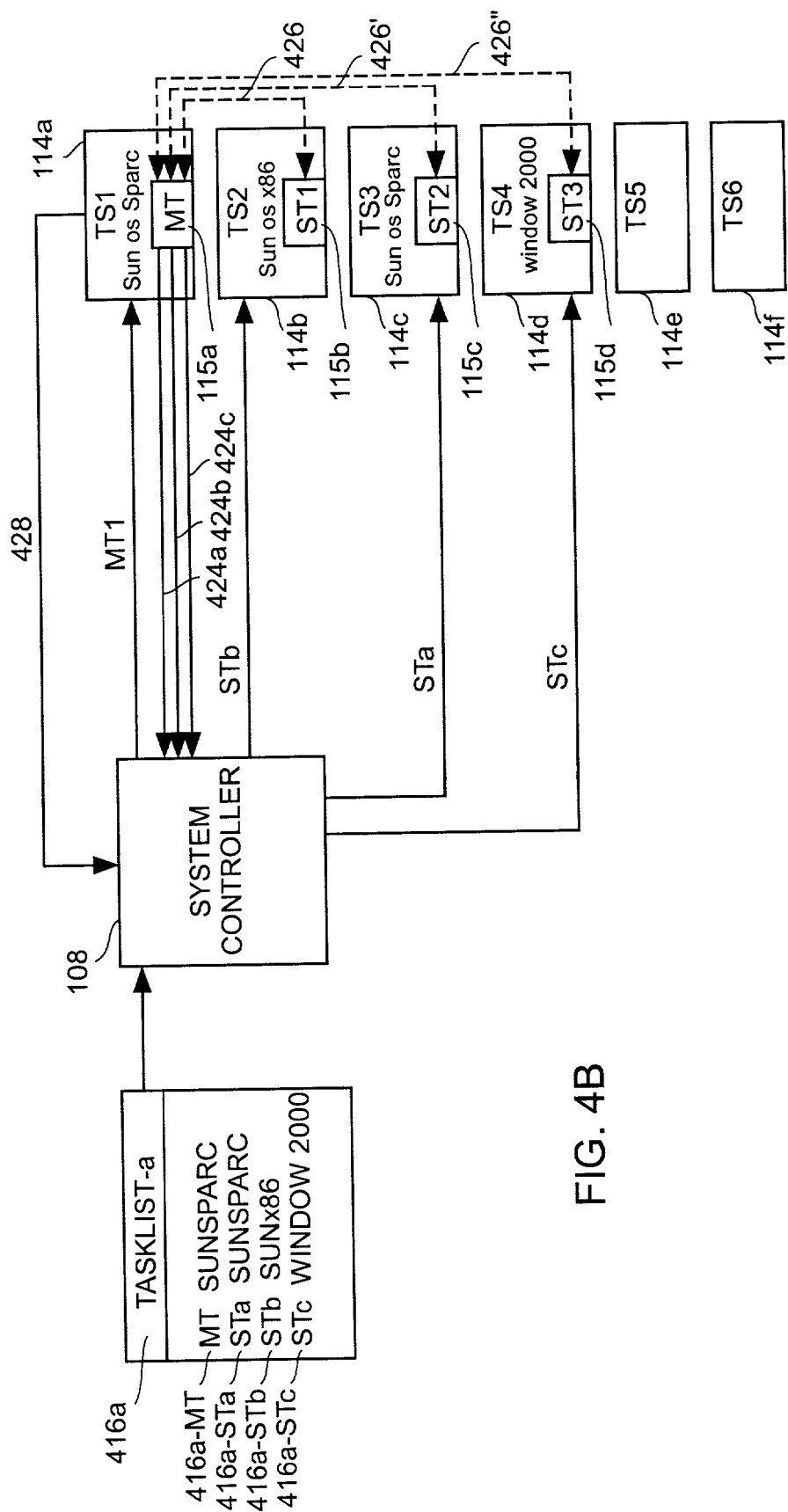
FIG. 4B is a block diagram depicting the implementation of a shuffle execution order to process a group of tasks by a plurality of test systems, in accordance to still another embodiment of the present invention.

Implementing a shuffle execution order to execute a set of tasks in a tasklist by a plurality of test systems can further be understood with respect to the block diagram depicted in FIG. 4B, in accordance with one embodiment of the present invention. As shown, a tasklist 416 includes a main task 416a-MT and a plurality of subtasks 416a-STa, 416a-STb, and 416a-STc. The illustrated main task 416a-MT and the subtask 416a-STa are configured to be executed on SunOS Sparc test systems while the subtasks 416a-STb must be run on a SunOS X86 test system, and the subtask 416a-STc should be run on a Windows 2000 test system.

In one implementation, tasklist execution starts by the system controller 108 reading the tasklist 416a. Specifically, the system controller 108 reads the tasklist 416a so as to determine the number of test systems required to run the main task and the subtasks as well as their respective required attributes. For instance, in the example of FIG. 4B, the system controller 108 attempts to find four local or remote test systems to execute the main task 416a-MT and the three subtasks 416a-STa, b, and c. In locating the necessary number of test systems, the system controller 108 must locate two SunOS Sparc test systems to run the main task 416a-MT and the subtask 416a-STa, a SunOS X86 test system to execute the subtask 416a-STb, and a Windows 2000 test system to run the subtask 416a-STc.

In the example shown in FIG. 4B, the system controller 108 has been shown to have allocated the SunOS Sparc test systems 114a and 114c to run the main task 416a-MT and the subtask 416a-STa, the SunOS X86 test system 114b to run the subtask 416a-STb, and a Windows 2000 test system 114d to run the subtask 416a-STc.

Once the required number of test systems have been allocated, the system controller 108 deploys the main task 416a-MT to the first allocated SunOS Sparc test system (i.e., the test system 114a). The test system 114a will then start executing a main task 115a. While being executed, the main task 115a dispatches a special request 424a to the system controller 108, requesting the dispatch of the first subtask, a subtask 115b, which requires execution on a SunOS X86 test system. Upon receiving the special request 424a, the system controller 108 searches the tasklist 416a for a first subtask required running on a SunOS X86 test machine. Thus, as shown in this embodiment, the subtask 416a-STb is selected and then dispatched to the test system 114b. Upon receiving the subtask 115b, the test system 114b starts the remote execution of the subtask 115b. As shown, the main task 115a and the subtask 115b are in communication using the communication line 426.

Meanwhile, the main task 115a has reached a point at which the next subtask should be called for execution. That is, the main task 115a has arrived at a point in which a subtask 115c required execution on a SunOS Sparc test system should start execution. At this point, in one instance, the main task 115a dispatches a special request 424b to the system controller 108, requesting the deployment of the first-in-line subtask required running on a SunOS Sparc test system. As shown in the embodiment of FIG. 4B, the next-in-line subtask having similar attributes is the subtask 416a-STa. Upon locating the subtask 416a-STa, the system controller 108 deploys the subtask 416a-STa to the next-in-line SunOS Sparc test system 114c. Once the test system 114c receives the subtask 115c, the test system 114c initiates the execution. Again, the subtask 115c communicates with the main task 115a through the communication line 426'.

Once again, while main task 115a and the subtasks 115b and 115c are being executed, execution of a subtask 115d should be initiated. Again, the main task 115a dispatches a special request 424c to the system controller 108, requesting a subtask having a Windows 2000 attribute. Subsequent to receiving this special request 424c, the system controller 108 searches the tasklist 416 for a subtask having a Windows 2000 attribute. As shown, in the embodiment of FIG. 4B, the next-in-line subtask having the Windows 2000 attribute, is the subtask 416a-STc. Upon locating this subtask, the system controller 108 deploys the subtask 416a-STc to the next in line allocated Windows 2000 test system 114d. At this point, the test system 114d initiates the execution of the subtask 115d. Yet again, the subtask 115d maintains a communication line 426" with the main task 115a.

At this point, the main task 115a has concluded the dispatching of all three subtasks 115b–115c. In a same manner, the system controller 108 has deployed the main task 416a-MT and all the subtasks 416a-STa-c of the first tasklist 416. Upon the system controller making such determination, the system controller 108 proceeds to read the next-in-line tasklist.

As shown, the main task 115a is in communication with subtasks 115b, 115c, and 115d using the respective communication lines 426, 426', and 426". In one example, the main task 115a implements the communication lines to subtasks 115b–115d to synchronize the subtask execution. Additionally, the communication lines 426, 426', and 426" are implemented by the subtasks 115b–115c to provide the main task with a feed back regarding the status of the subtask being run. In one example, each of the communication lines 426, 426', and 426" is implemented to inform the main task 115a of the conclusion of the respective subtask 115b–115c.

In one example, the main task 115a communicates the task results 428 to the system controller 108. In one embodiment, the task results 428 are cached. In this manner, the task results can be viewed or analyzed, if needed. Thus, in accordance with one embodiment of the present invention, a plurality of tasks, each having a different execution order, can be grouped together for execution. Advantageously, the required number of processing resources can be allocated ahead of time, irrespective of the execution order of each task.

It must be appreciated that in one example, if a subtask having the specific attributes requested by the main task cannot be allocated by the system controller, the system controller is configured to generate and dispatch a special error message or an exception message.

For instance, Table 2 below includes an exemplary code for an exemplary shuffle execution order.

TABLE 2

Exemplary Code for Shuffle Execution Order

```
<testrequest order="shuffle">
    <jdk dir+/usr/jjava1.3" runtime="" / >
    <jobname jobname+"dtonga_main" / >
    <suitename suitename="dtonga_main" / >
     dir="/net/ultracos/export/cos/knight_ws/results /"
    emailto=user1@Sun.Com emailcc+user1.@Sun.Com
    subject="Tasklists testing" / >
    <attr key="software.os.arch" value="sparc" / >
    <attr key="software.os.name" value="SunOS" / >
    <subrequest>
        <jdk dir="/net/goa1/export/home/SQE/Solaris_JDK_1.3"
        runtime="" / >
        <jobname jobname="dtonga_client-1" / >
        <suitename suitename="dtonga_client" / >
         dir="/net/ultracos/export/cos/knight_ws?results/"
        emailto=user1@Sun.Com emailcc=user1@Sun.Com"
        subject="Subtask N.1" / >
        <attr key="software.os.arch" value="sparc" / >
        <attr key="software.os.name" value=SunOS" / >
    </subrequest>
    <subrequest>
        <jdk dir="/net/goa1/export/home/SQE/Solaris_JDK_1.3"
        runtime="" / >
        <jobname jobname="dtonga_client-2" / >
        <suitename suitename="dtonga_client" / >
         dir="/net/ultracos/export/cos/knight_ws/results/"
        emailto=user1@Sun.Com emailcc=user1@Sun.Com
        subject="Subtask N.2" / >
        <attr key="software.os.arch" value="x86" / >
        <attr key="software.os.name" value="SunOS" / >
    </subrequest>
    <subrequest>
        <jdk dir="/net/goa1/export/home/SQE/Solaris_JDK_1.3"
        runtime="" ?>
        <jobname jobname="dtonga_client-3" / >
        <suitename suitename="dtonga_client" / >
         dir="/net/ultracos/export/cos/knight_ws/results /"
        emailto=user1@Sun.Com emailcc=user1@Sun.Com
        subject="Subtask N.3" / >
        <attr key="software.os.arch" value=x86" / >
        <attr key="software.os.name" value="Windows 2000" / >
    </subrequest>
< / testrequest>
```

Figure 5A:
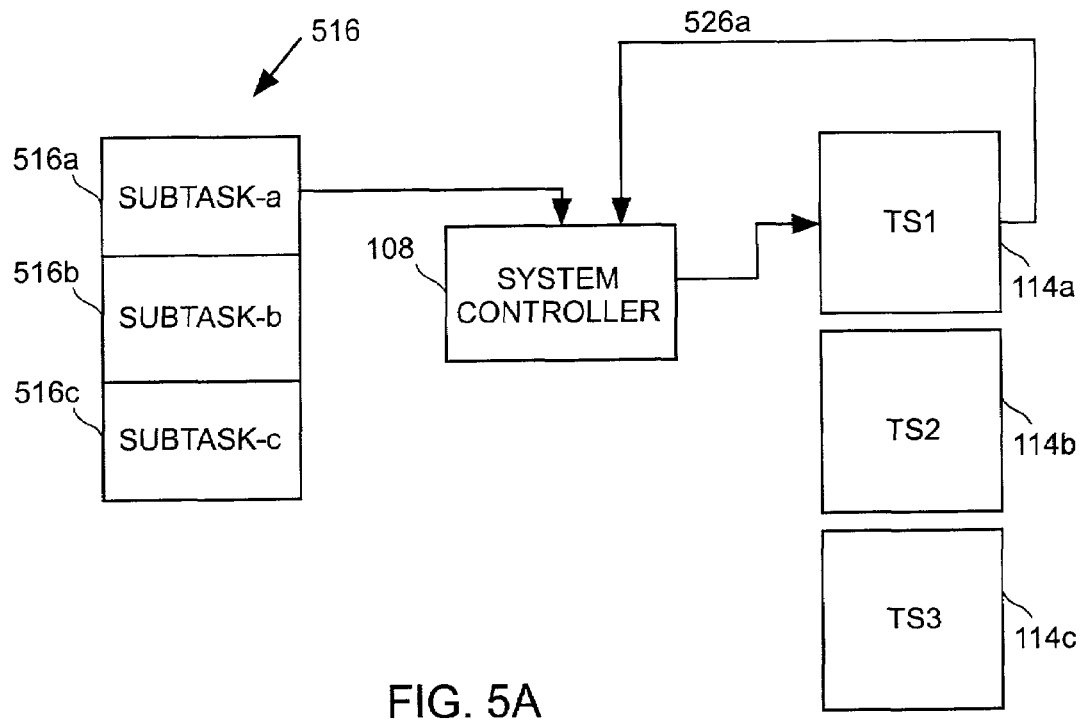
FIG. 5A is a block diagram showing the use of sequential execution order to execute a plurality of tasks by a plurality of test systems, in accordance with still another embodiment of the present invention.
Figure 5B:
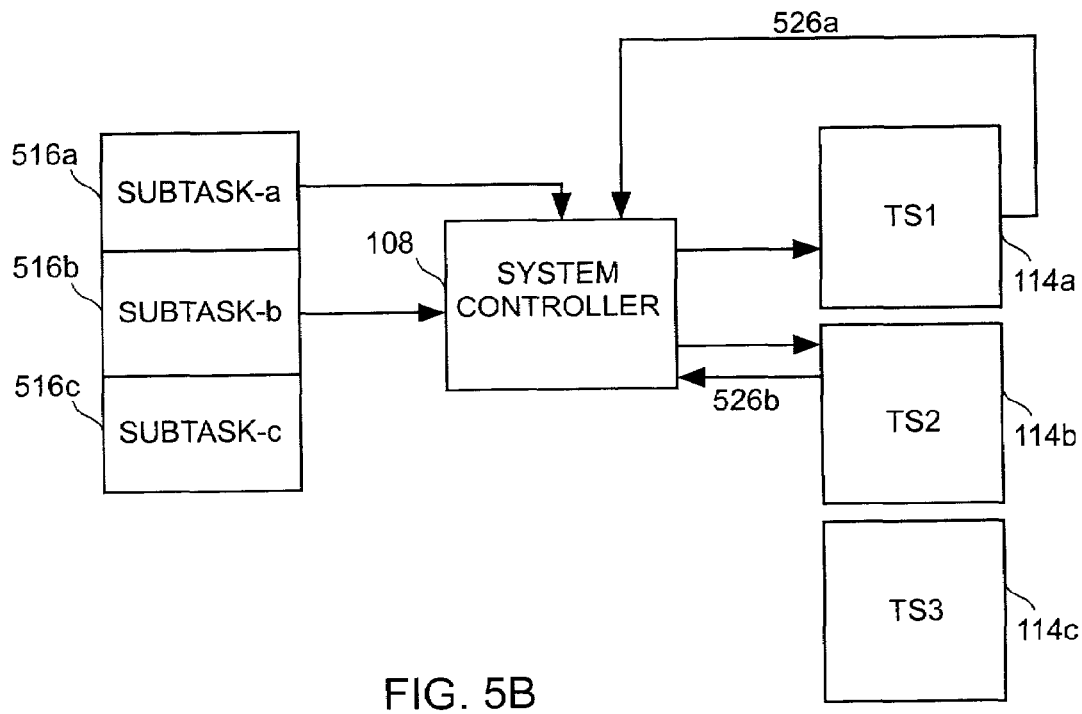
FIG. 5B is a block diagram showing the use of sequential execution order to execute a plurality of tasks by a plurality of test systems in accordance to yet another embodiment of the present invention.
Figure 5C:
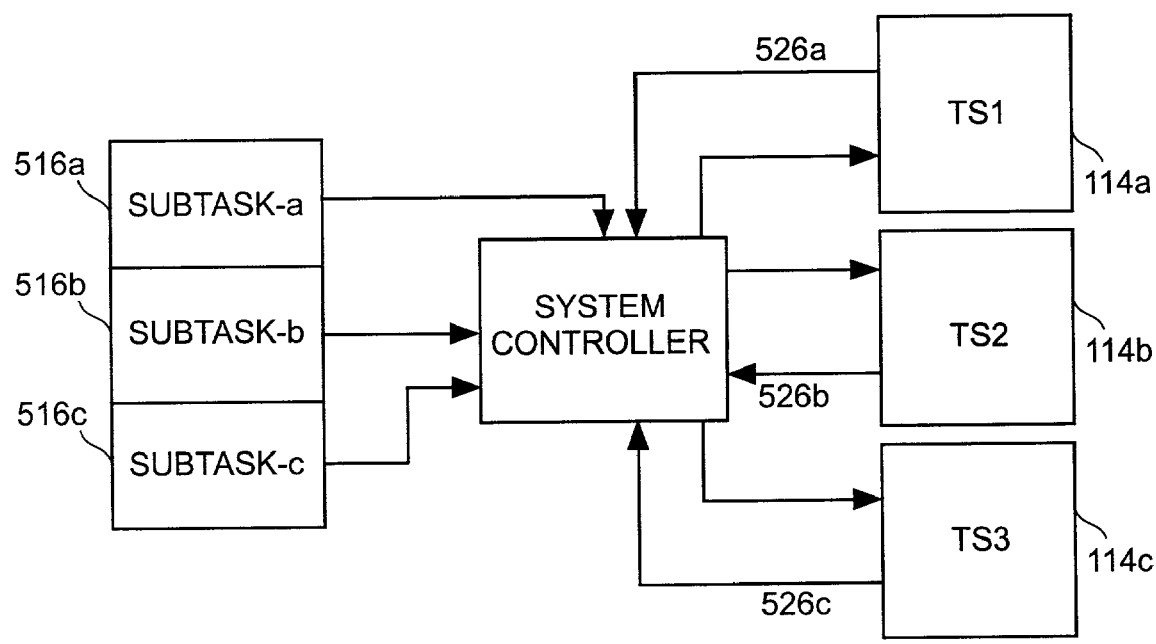
FIG. 5C is a block diagram showing the use of sequential execution order to execute a plurality of tasks by a plurality of test systems in accordance to yet another embodiment of the present invention.

Turning to FIGS. 5A–5C, the sequential execution of a plurality of tasks can further be understood, in accordance with one embodiment of the present invention. As shown in FIG. 5A, a taskqueue 516 contains a plurality of subtasks 516a–516c, each of which is a single task. The system controller 108 is configured to read each of the plurality of the subtasks 516a–516c and allocate a test system to execute each subtask. For instance, a first subtask 516a is read by the system controller 108 and a test system 114a is allocated for the execution of the first subtask 516a. Subsequent to allocating the necessary number of test systems, the system controller dispatches the first subtask 516a to the test system 114a. As previously discussed in more detail, the first subtask 516a is assigned to the test system 114a, as the test system 114a has attributes similar to those of the first subtask 516a.

At this point, the test system 114a initiates the execution of the first subtask 516a. As the first subtask 516a is being executed, the system controller 108 awaits for the execution of the subtask 516 to stop. At this point, the test system 114a communicates the task results 526a to the system controller 108, which in one example, are cached for viewing and analysis.

As shown in FIG. 5B, once the system controller 108 receives the task results 526a from the test system 114a, the system controller proceeds to read the second subtask 516b (i.e., the next task request or subtask in-line). As discussed in more detail above, the system controller 108 has allocated the necessary test system to execute the second subtask (i.e., test system 114b). The system controller 108 then deploys the second subtask 516b to the test system 114b. As discussed earlier, test system 114b has attributes that are similar to the attributes of the second subtask 516b. Once again, the system controller 108 awaits receiving a feed back from the test system 114b, indicating the end of second subtask 516b execution. Upon the test system 114b concluding the second tasklist 516b execution, the test system 114b is configured to dispatch a task result 526b to the system controller, which is cached by the system controller 108 for further review or analysis.

Next, as shown in FIG. 5C, the system controller continues to read the third subtask 516c, allocate the test system 114c to execute the third subtask 516c, and deploy the third subtask 516c to the test system 114c. Again, the system controller 108 awaits the conclusion of the execution of the third subtask 516c. Upon receiving a task results 526c, the system controller 108 caches the task results 526c for future viewing and analysis. In this manner, beneficially, the embodiments of the present invention can flexibly process a plurality of tasks in accordance with their respective execution orders.

Table 4 illustrates an exemplary code for an exemplary sequential execution order.

TABLE 4

Exemplary Code for Sequential Execution Order

```
<testrequest order="sequential">
<jdk dir="/usr/java1.3" runtime="" />
<jobname jobname="main_service" />
<suitename suitename="gen_suite" />
 dir="/net/ultracos/export/cos/knight_ws/results/"
emailto="user1@Sun.Com"
emailcc="user1@Sun.Com" subject="Tasklists testing" />
<attr key="software.os.arch" value="sparc" />
<attr key="software.os.name" value="SunOS" />
<attr key="network.name" value="ultracos" />
<taskrequest>
<jdk dir="/net/goa1/export/home/SQE/Solaris_JDK_1.3" runtime="" />
<jobname jobname="gen_client_test" />
<suitename suitename="gen_suite1" />
 dir="/net/ultracos/export/cos/knight_ws/results/" emailto=""
emailcc="" subject="Subtask N.1" />
<attr key="software.os.arch" value="sparc" />
<attr key="software.os.name" value="SunOS" />
</taskrequest>
</testrequest>
```

Figure 6:
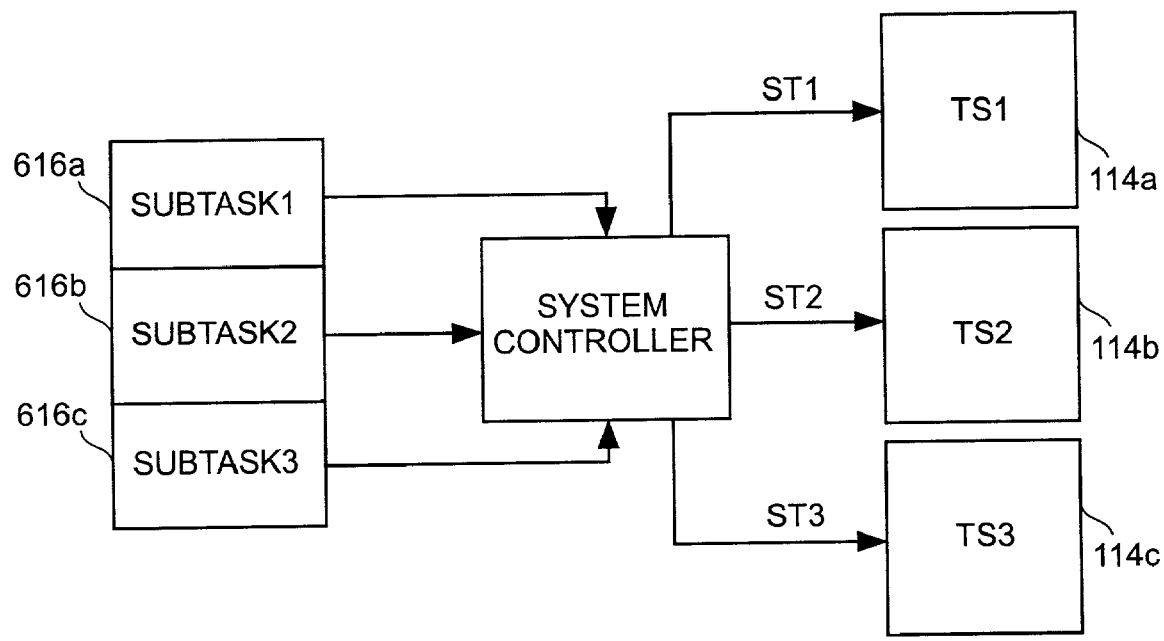
FIG. 6 is a block diagram showing the use of concurrent execution order in processing a plurality of tasks, in accordance to yet another embodiment of the present invention.

The concurrent execution of a plurality of tasks can further be understood with respect to the embodiment of FIG. 6, in accordance with one embodiment of the present invention. As shown, the taskqueue 616 includes a plurality of subtasks 616a–616c, which in this embodiment, each is a single task. The system controller 108 reads a first subtask 616a and allocates a test system 114b for the execution of the first subtask 616a. The system controller 108 also reads the second subtask 616b and allocates the test system 114a to execute the second subtask 616b. The system controller further reads the third subtask 616c and allocates the test system 114c to execute the subtask 616c. As discussed in more detail above, each subtask is allocated to a test system having similar attributes as the subtask. Furthermore, each of the subtasks is configured to be run substantially at the same time.

It must be noted that although in the embodiments of FIGS. 5A–5C and 6 the taskqueue is shown to include a single task, in another embodiment, each of the subtasks within the taskqueue can be configured to include a tasklist.

Comparatively, an exemplary code for concurrent execution order is shown below in Table 3.

TABLE 3

Exemplary Code for Concurrent Execution Order

```
<testrequest order="concurrent">
<jdk dir="/usr/java1.3" runtime="" />
<jobname jobname="main_service" />
<suitename suitename="gen_suite1" />
 dir="/net/ultracos/export/cos/knight_ws/results/"
emailto="user1@Sun.Com"
emailcc="user1@Sun.Com" subject="Tasklists testing" />
<attr key="software.os.arch" value="sparc" />
<attr key="software.os.name" value="SunOS" />
<taskrequest>
<jdk dir="/net/goa1/export/home/SQE/Solaris_JDK_1.3" runtime="" />
<jobname jobname="gen_client_test1" />
<suitename suitename="gen_suite1" />
 dir="/net/ultracos/export/cos/knight_ws/results/" emailto=""
emailcc="" subject="Subtask N.1" />
<attr key="software.os.arch" value="sparc" />
<attr key="software.os.name" value="SunOS" />
</taskrequest>
<taskrequest>
<jdk dir="/net/goa1/export/home/SQE/Solaris_JDK_1.3" runtime="" />
<jobname jobname="gen_client_test2" />
<suitename suitename="gen_suite1" />
 dir="/net/ultracos/export/cos/knight_ws/results/" emailto=""
emailcc="" subject="Subtask N.1" />
<attr key="software.os.arch" value="x86" />
<attr key="software.os.name" value="SunOS" />
</taskrequest>
<taskrequest>
<jdk dir="/net/goa1/export/home/SQE/Solaris_JDK_1.3" runtime="" />
<jobname jobname="gen_client_test3" />
<suitename suitename="gen_suite1" />
 dir="/net/ultracos/export/cos/knight_ws/results/" emailto=""
emailcc="" subject="Subtask N.1" />
<attr key="software.os.arch" value="x86" />
<attr key="software.os.name" value="Windows 2000" />
</taskrequest>
</testrequest>
```

Once substantially all subtasks 616a–616c have been read and allocated, the system controller 108 is configured to deploy all subtasks for execution by the respective test system 114b, 114a, and 114c almost simultaneously. Thus, in accordance with one embodiment of the present invention, a system controller 108 can deploy a plurality of subtasks for execution at the same time, without having to wait for the task results of a previously deployed subtask.

Figure 7A:
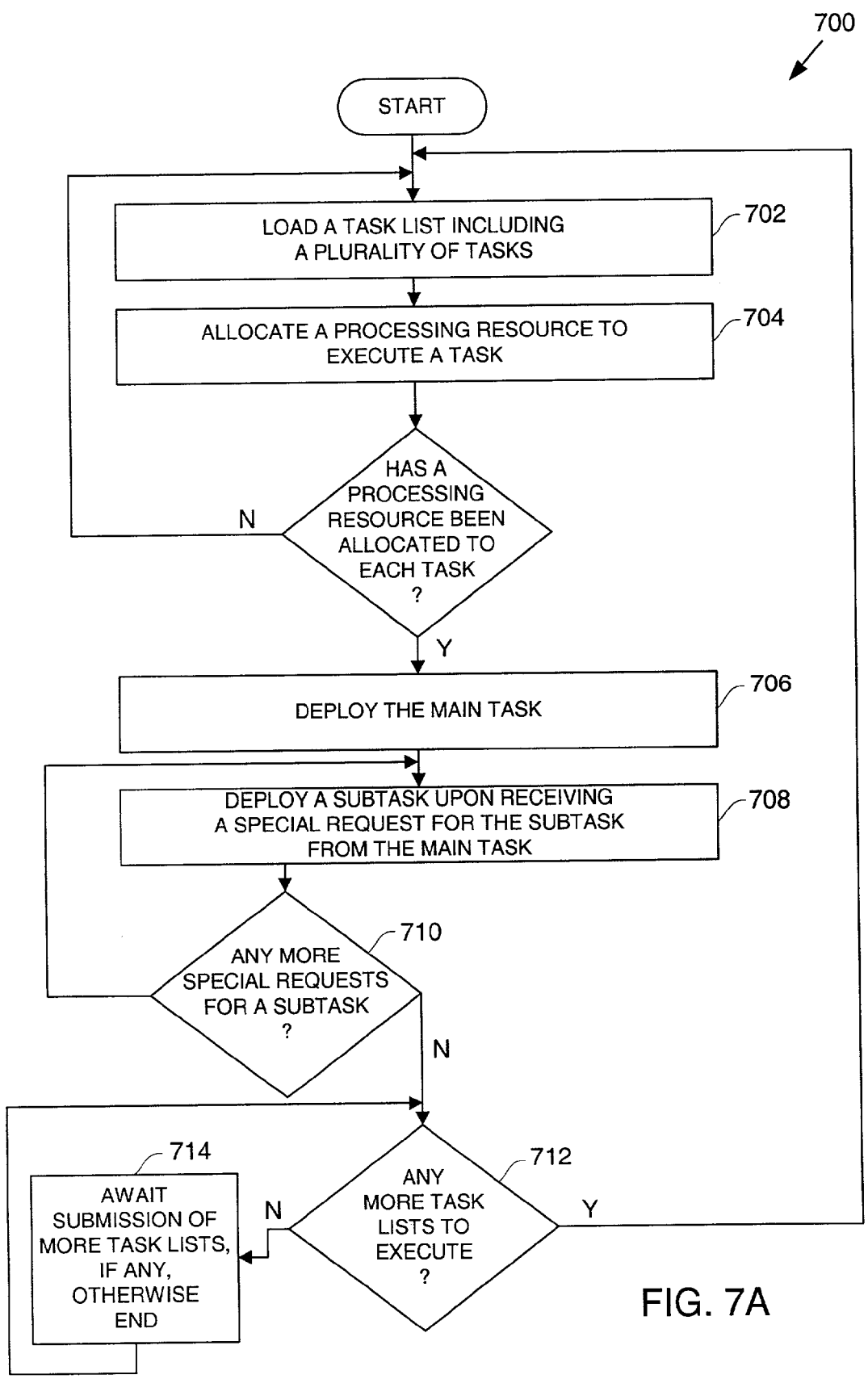
FIG. 7A is a flow chart diagram illustrating a method operations implemented in executing of a plurality of tasks using the shuffle execution order in a DPF system, in accordance with yet another embodiment of the present invention.
Figure 7B:
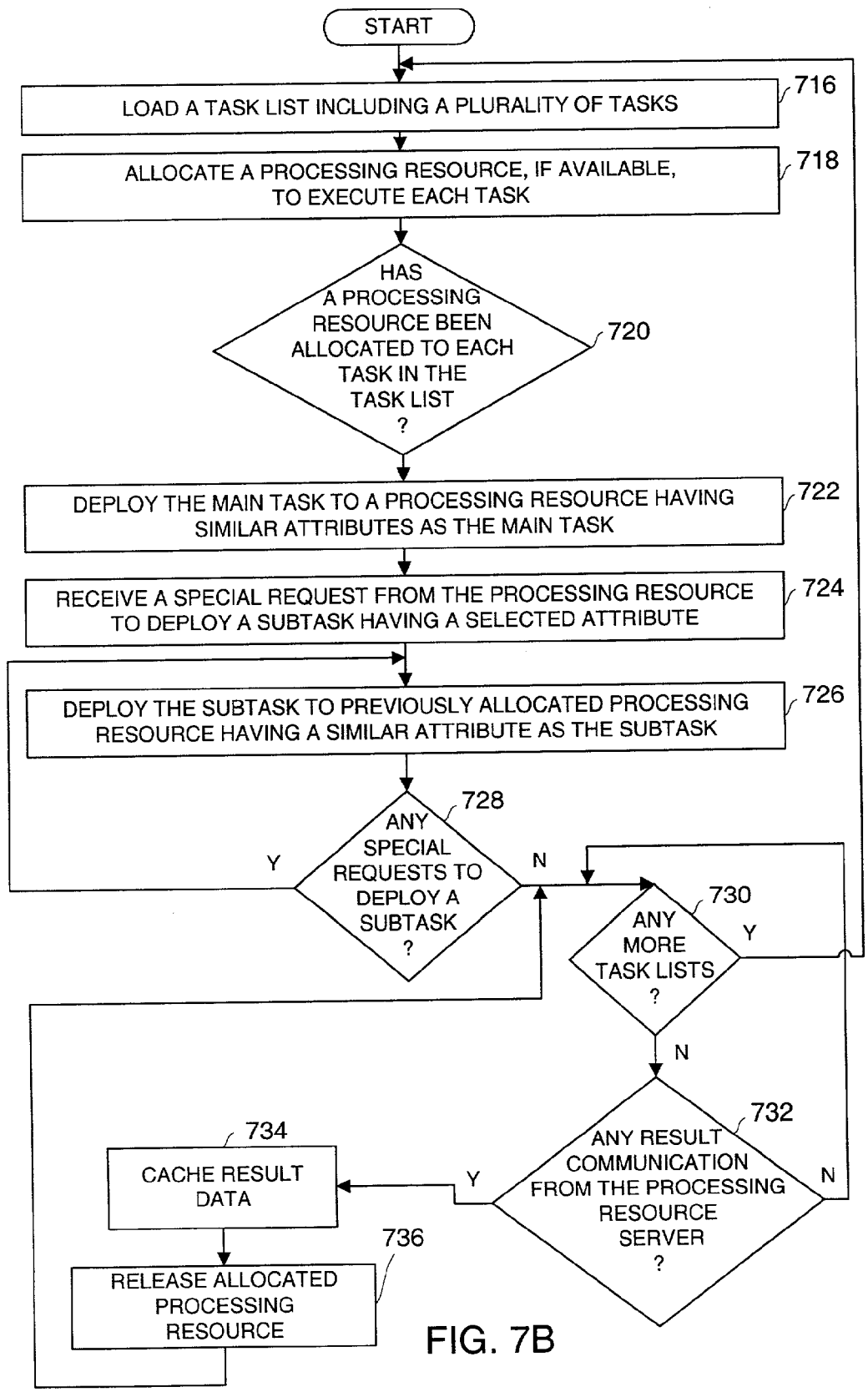
FIG. 7B is a flow chart diagram illustrating a method operations implemented in executing of a plurality of tasks using the shuffle execution order in a DPF system, in accordance with yet another embodiment of the present invention.

The flow chart diagram 700 shown in FIG. 7A illustrates the method operations performed in grouping a plurality of tasks for execution, in accordance with one embodiment of the present invention. The method begins in operation 702 in which a tasklist configured to include a plurality of tasks is loaded. In one exemplary embodiment implementing the shuffle execution order grouping, the tasklist includes a main task and a plurality of subtasks. Next, in operation 704, a processing resource is allocated to the execution of each task. In one example, the system controller reads the tasklist determining the number of the required processing resources as well as the respective attributes of each processing resource. The system controller then communicates with the registry service attempting to find and locate the processing resources having the required attributes. In one instance, the system controller starts allocating the processing resources by going through the tasks within the tasklist in-order. Upon finding each processing resource, the system controller allocates the selected processing resource from the pool of available processing resources and proceeds to find the suitable processing resource to execute the next task. In this manner, the system controller is configured to allocate a processing resource to execute each task within the tasklist.

Proceeding to operation 706, it is determined whether a processing resource has been allocated to each of the tasks in the tasklist. If a processing resource has not been allocated to all tasks within the tasklist, the method continues to operation 702, in which the method loads a tasklist. In one example, not having allocated a processing resource to all tasks may be attributed to unavailability of suitable processing resources. In that case, the system controller can be configured to pass over that particular tasklist and proceed with the execution of the next tasklist in the taskqueue. Upon deploying all tasks within the next tasklist, the system controller can be configured to return to the passed over tasklist and proceed with allocating the processing resources.

If in operation 704 it is determined that all tasks within the tasklist have been allocated, the method continues to operation 706 in which the system controller deploys the main task to the suitable processing resource. Thereafter, in operation 708, resource upon receiving a special request from the main task, the system controller deploys a subtask to be executed by a processing. In one example, the main task determines the execution order of the subtasks. That is, the main task may decide to execute all subtasks concurrently, sequentially, or shuffled.

In one example, the special request includes the attributes of the subtask to be processed. Upon receiving the special request from the main task, the system controller searches the tasklist trying to locate the subtask having the requested attributes. Once the selected subtask has been located, the selected subtask is deployed to the previously allocated processing resource having attributes similar to those of the subtask.

Proceeding to operation 710, it is determined whether the system controller has received any more special requests for additional subtasks. If an additional special request has been received, the method continues to operation 708 in which the requested subtask is found and deployed. If the main system has not received any additional special request, the method continues to operation 712 in which it is determined whether there are any more tasklists to be executed in the taskqueue. If there is an additional tasklist to be executed, the method continues to operation 702, in which the tasklist is loaded. If all tasklists in the taskqueue have been executed or are currently being executed, the method continues to operation 714, in which the method awaits the submission of more tasklists for execution, if more tasklists are submitted. If not, the method ends.

The flow chart diagram 700b depicts the method operations performed by the system controller to execute a group of tasks using the shuffle execution order, in accordance with one embodiment of the present invention. The method begins in operation 716 in which a tasklist including a plurality of tasks is loaded. Next, in operation 718, the system controller allocates a processing resource to execute each task within the tasklist. As discussed in more detail above, the processing systems allocated are configured to have attributes similar to those required by the tasks within the tasklist.

Proceeding to operation 720, the method determines whether a processing resource has been allocated to execute each task within the tasklist. If a processing resource has not been allocated to execute each of the tasks, the method continues to operation 716. However, if a processing resource has been allocated to each of the tasks within the tasklist, the method continues to operation 722 in which a main task within the tasklist is deployed. As discussed in more detail above, the main task is deployed to a processing resource that has attributes that are similar to those of the main task.

Upon deploying the main task, the method continues to operation 724 in which the system controller receives a special request from the main task to deploy a subtask having an attribute. Next, in operation 726, the system controller deploys the subtask to the previously allocated processing resource. As designed, the subtask is deployed to the processing resource that has attributes similar to those of the subtask. In one example, the system controller searches the tasks within the tasklist to locate the subtask having the requested attributes.

Continuing to operation 728, the system controller determines whether the system controller has received another special request. If the system controller has received another special request, the method continues to operation 726 in which the requested subtask is deployed. However, if is determined that no other special requests have been received, the method continues to operation 730 in which the system controller determines whether there are any more tasklists in the taskqueue. If it is determined that there are more tasklists in the taskqueue, the method continues to operation 716. Other wise, the method continues to operation 732 in which the system controller determines whether the system controller has received any task result communication from the processing resource server. If a task result communication has not been received, the method continues to operation 730. If it is determined that a task result communication has been received from the processing resource server, the method continues to operation 734 in which the task result data is cached for viewing and analysis. Thereafter, the method continues to operation 736, in which the system controller releases the allocated processing resources. The method then proceeds to operation 730 in which the system controller determines whether there is any additional tasklists in the taskqueue.

Figure 7C:
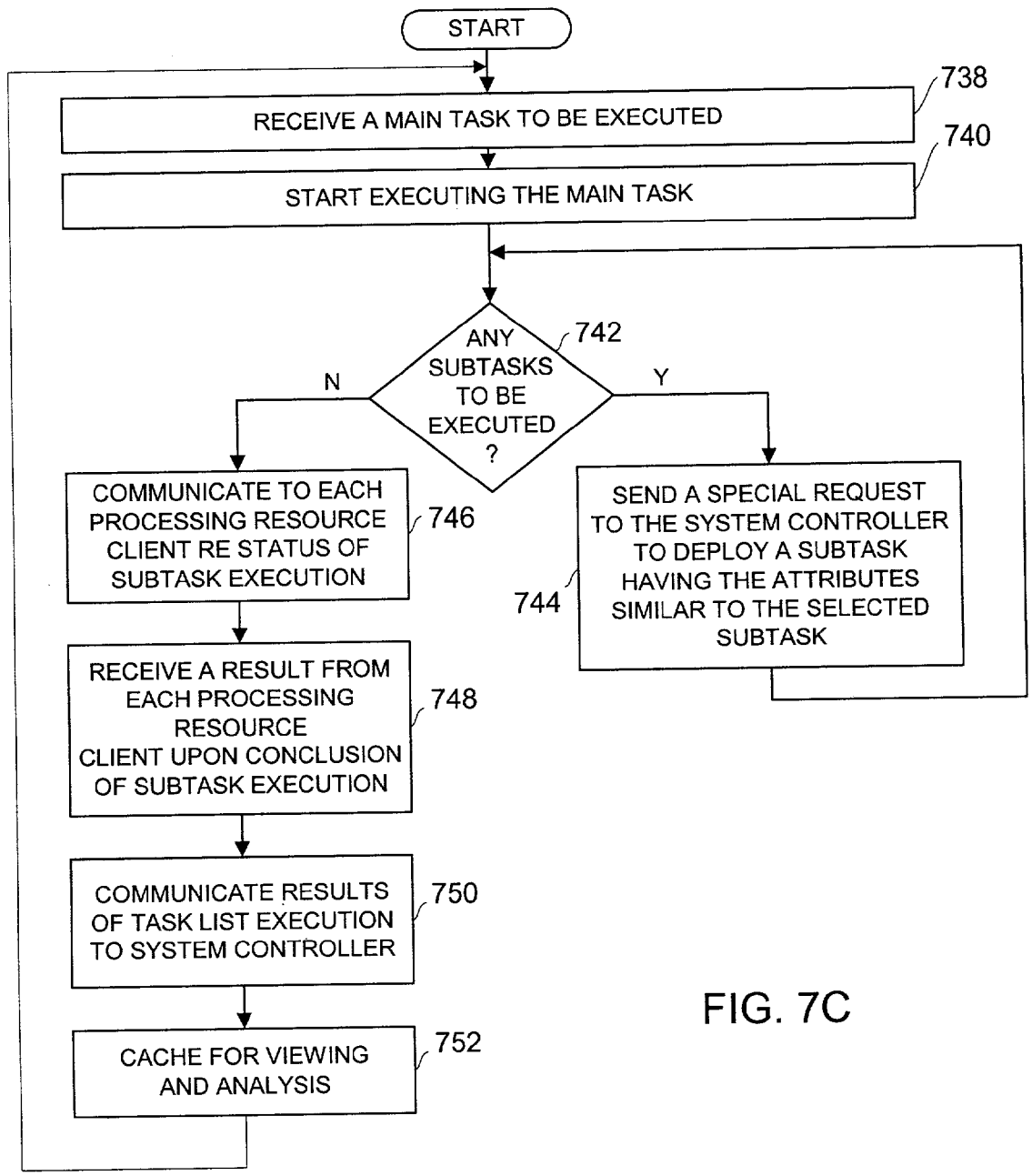
FIG. 7C is a flow diagram illustrating a method operations implemented in executing of a plurality of tasks using the shuffle execution order in a DPF system, in accordance with yet another embodiment of the present invention.

The Flow chart 700c depicted in FIG. 7C illustrates the method operations performed by a processing resource server, in accordance with one embodiment of the present invention. The method starts in operation 738 in which the processing resource server receives a main task to be executed. As discussed in more detail above, the processing resource server as well as the processing resource clients have already been allocated for processing the main task and the subtasks, respectively. Next, the processing resource server starts executing the main task in operation 740.

Proceeding to operation 742, the main task decides whether there are any subtasks to be executed. If there is a subtask to be executed, the method continues to operation 744 in which the processing resource server sends a special request to the system controller to deploy a subtask. The processing resource server provides the system controller with the attributes of the requested subtask. Next, the method continues to operation 742 wherein it is determined whether there are any additional subtasks to be executed.

If in operation 742 a determination is made that there are no additional subtasks to be executed, the method continues to operation 746 in which the processing resource server communicates with each of the processing resource clients regarding the status of the execution of the respective subtask. In one example, the processing resource server monitors the engagement of each of the processing resource clients and the synchronization of all communications between the processing resource server and each of the processing resource clients.

Next, in operation 748, the processing resource server receives a result from each of the processing resource clients upon the conclusion of the respective subtask execution. That is, each subtask dispatches its respective results of the subtask execution to the processing resource server. Then, in operation 750, the processing resource server communicates the results of tasklist execution to the system controller, which in operation 752 are cached for viewing and analysis. The method next proceeds to operation 738 in which the processing resource server receives a different main task.

Thus, in accordance with one embodiment of the present invention, a plurality of tasks, each having a different execution order, are grouped together for execution by a plurality of local or remote processing resources. In this manner, the grouping of tasks and the distribution of tasks can be done automatically by the master computer server, thus eliminating the necessity of manual execution and distribution of a plurality of tasks.

Figure 8:
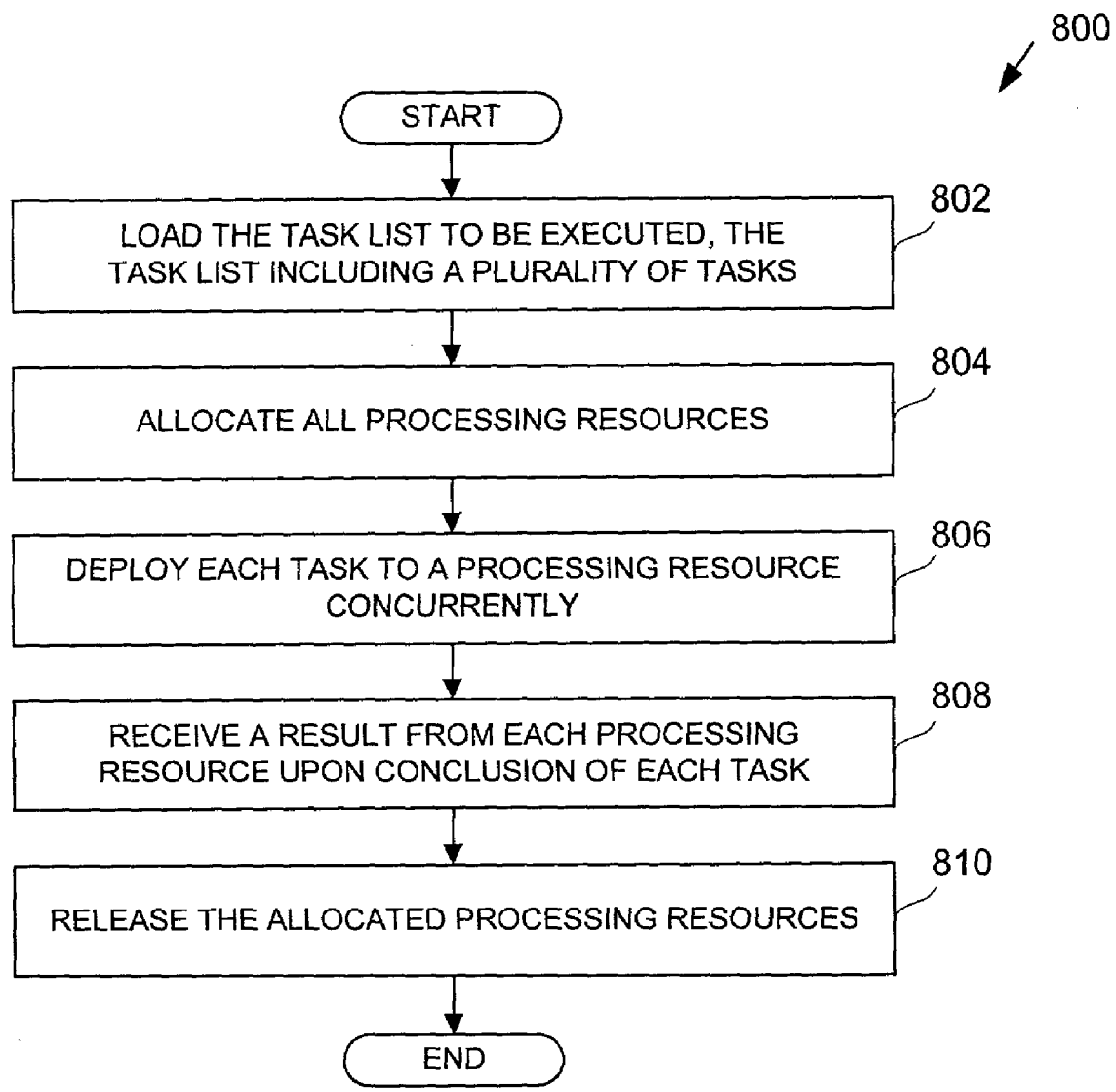
FIG. 8 is a flow chart diagram illustrating a method operations implemented in executing a plurality of tasks using the concurrent execution order, in accordance with yet another embodiment of the present invention.

The flow chart 800 depicted on FIG. 8 illustrates the method operations in concurrent execution of a plurality of tasks, in accordance with one embodiment of the present invention. The method begins in operation 802 in which the tasklist to be executed is loaded. The tasklist includes a plurality of tasks. Next, in operation 804, all necessary processing resources required to execute each task within the tasklist is allocated. Continuing to operation 806, system controller deploys each of the tasks within the tasklist to a processing resource substantially concurrently. That is, in one embodiment, the processing resource is not required to wait for the receipt of a task result before it proceeds with deploying the next task within the tasklist.

Next, in operation 808, the system controller is configured to receive a result from each of the processing resources upon each processing resource concluding the execution of the respective task. Thereafter, in operation 810, the system controller releases the allocated processing resources for use in the execution of a different tasklist. In this manner, beneficially, a group of tasks requiring concurrent execution can be distributed for processing to a plurality of processing resources, significantly reducing the length of time required to execute each process.

Figure 9:
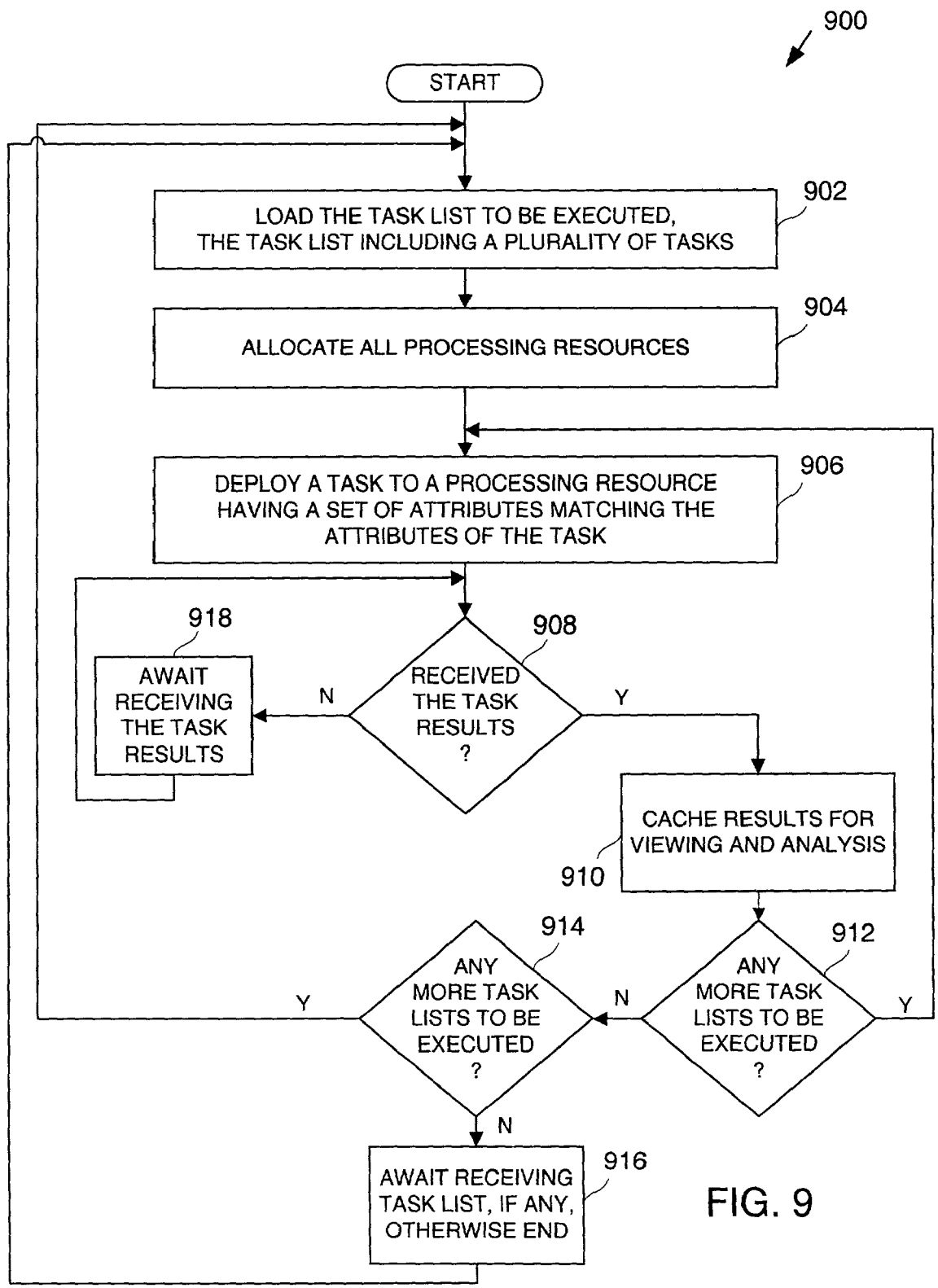
FIG. 9 is a flow chart diagram illustrating a method operations implemented in executing a plurality of tasks using the concurrent execution order, in accordance with yet another embodiment of the present invention.

Turning to flow chart diagram 900 of FIG. 9, method operations in sequential processing of a plurality of tasks can further be understood, in accordance with one embodiment of the present invention. The method begins in operation 902 in which the tasklist to be executed is loaded. In one example, the tasklist is designed to include a plurality of tasks. Next, in operation 904, all required processing resources are allocated. Continuing to operation 906, a task is deployed to a processing resource for processing. As discussed above, a set of attributes of the task is configured to match the attributes of the processing resource allocated to execute the task.

Continuing to operation 908, a determination is made as to whether the system controller has received the results of the task execution. If the system controller has not received the results, the method continues to operation 908. However, if the system controller has received the results of the task execution, the method continues to operation 910 in which the results are cached for viewing and analysis. Next, in operation 912 a determination is made as to whether any more tasks await execution in the tasklist. If there is a task to be executed, the method continues to operation 906 in which the task is deployed to a processing resource. If the tasklist does not contain a task awaiting to be executed, the method moves to operation 914, in which it is determined whether the taskqueue includes a tasklist awaiting execution. If there is a tasklist awaiting execution, the method continues to operation 902 in which the tasklist is loaded. If no tasklist awaits execution, the method awaits receiving a tasklist for execution, if one is submitted. Otherwise, the method ends.

Therefore, in accordance with embodiments of the present invention, a plurality of tasks, each having a different execution order, can be executed by a plurality of processing resources each having a different hardware/software configurations and platforms and defined in different buildings and localities.

The advantages of the present invention are numerous. Most notably, the embodiments of the present invention provide a user, a convenient manner of grouping a plurality of tasks for execution by a plurality of local/remote processing resources. Another advantage of the task grouping of the present invention is that a user is enabled to group a plurality of tasks using sequential, concurrent, or shuffle execution order. Yet another advantage of the present invention is that a user can allocate the number of network resources designed to execute each of the tasks within the plurality of tasks, ensuring the availability of adequate resources when needed.

Although the present invention mainly describes exemplary embodiments of test grouping in a distributed test framework system design to execute a test suite, it must be understood by one having ordinary skill in the art that the task grouping of the present invention can be implemented in any distributed processing framework system used to run any type of computer process. Additionally, although the embodiments of the present invention implement one system controller, one having ordinary skill in the art must appreciate that in a different embodiment, any number of system controllers can be implemented. Additionally, although in one example the DTF system is called "KNigHT," in a different embodiment, the DTF system can be called any arbitrary name.

Additionally, although the present invention is described based on the Jini technology, other network technologies having the capability to create an ad-hoc group of test systems may be implemented (e.g., RMI, TCP/IP Sockets, etc.). Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for executing processing tasks in a distributed processing framework system including two or more processing resources, the method comprising:

identifying a main task of a tasklist, with said main task having a plurality of main instructions, said main instructions being executable;

identifying a subtask of the main task, with said sub-task having a plurality of sub-instructions, said sub-instructions being executable;

allocating computing resources for the main task and the subtask before executing said plurality of main instructions and said plurality of sub-instructions, the allocated computing resource including a first computing system and a second computing system; and deploying the main task to the first computing system, a code of the main task being executed on the first computing system, the code of the main task having program instructions for requesting loading of a code for the subtask to the second computing system, the code forte subtask is in client-server communication with the code for the main task, such that the code for the main task receives processing results directly from the code for the subtask, wherein the first computing system is configured to be allocated to the main task continuously until each of the plurality of main instructions of the main task is executed or one of said plurality of main instructions of the main task causes an execution of the main task to discontinue, and further wherein the second computing system is configured to be allocated to the subtask continuously until each of the plurality of sub-instructions of the subtask is executed or an one of said plurality of sub-instructions of the subtask causes an execution of the subtask to discontinue.

2. A method for executing processing tasks in a distributed processing framework system as recited in claim 1, wherein the processing results received from the subtask are implemented to create a main task processing results to be communicated to a system controller.

3. A method for executing processing tasks in a distributed processing framework system as recited in claim 2, wherein the system controller releases the allocated computing resources upon receiving the main task processing results from the main task.

4. A method for executing processing tasks in a distributed processing framework system as recited in claim 1, further including, a plurality of subtasks in addition to the subtask, the plurality of subtasks configured to be controlled by the main task.

5. A method for distributing an execution of a plurality of tasks within a tasklist by a system controller, the plurality of tasks configured to be processed by a plurality of processing resources in a distributed processing framework (DPF) system, the method comprising:

loading the tasklist, the tasklist having a main task, including a plurality of main instructions, and a subtask including a plurality of sub-instructions;

allocating processing resources to execute the main task and the subtask within the tasklist before executing said plurality of main instructions and said plurality of sub-instructions, the allocated processing resources including a first processing resource and a second processing resource, the first processing resource being separate for the second processing resource;

deploying the main task to the first processing resource for execution;

deploying the subtask to the second processing resource once a special request for the subtask is received from the main task; and enabling communication between the main task and the subtask, the communication configured to provide the main task with a result of a subtask execution, wherein the first processing resource is configured to be allocated to the main task continuously until each of said plurality of main instructions is executed or one of said plurality of main instructions causes an execution of the main task to discontinue, and further wherein the second computing resource is configured to be allocated to the subtask continuously until each of said plurality of sub instructions is executed or one of said plurality of sub instructions causes an execution of the subtask to discontinue.

6. The method of claim 5, further including, communicating a result of a main task execution to the system controller, wherein the system controller releases the plurality of processing resources upon receiving the result of main task execution.

7. The method of claim 5, wherein allocating the processing resources to execute the main task and the subtask includes, loading the tasklist by the system controller;

searching a registry service for the processing resources having a plurality of attributes identical to a plurality of attributes of the main task and the subtask within the tasklist; and allocating the first and the second processing resources respectively having attributes identical to the main task and the subtask to the execution of the main task and subtask correspondingly having the identical attributes.

8. The method of claim 7, wherein deploying the subtask to the second processing resource once the special request for the subtask is received from the main task includes, dispatching the special request to the system controller, the special request configured to include the plurality of attributes of the subtask;

searching the tasklist, the searching configured to locate the subtask having the plurality of attributes included in the special request; and deploying the located subtask to the second processing resource having the plurality of attributes identical to the plurality of attributes of the subtask.

9. The method of claim 8, wherein the registry service is a look up service.

10. The method of claim 5, wherein the DPF is a distributed test framework (DTF) system.

11. The method of claim 5, wherein the main task is operated on a processing resource server.

12. The method of claim 5, wherein the subtask is operated on a processing resource client.

13. The method of claim 5, wherein the main task is a test harness.

14. A method for distributing an execution of a plurality of tasks by a system controller, the plurality of tasks configured to be processed by a plurality of processing resources in a distributed processing framework (DPF) system, the method comprising:

loading the plurality of tasks, each of which includes instructions to be executed;

allocating a separate processing resource to execute each task of the plurality of tasks before executing said instructions by searching a registry service for the processing resource having a plurality of attributes identical to a plurality of attributes of each task, and allocating each of the processing resources having a plurality of attributes identical to the plurality of each task to the execution of the task having the identical attributes;

deploying each task to a respective processing resource at the same time;

receiving a result task from each respective processing resource upon a conclusion of each task; and making the plurality of processing resources available for allocation of additional tasks upon receiving the result task from each of the plurality of processing resources.

15. The method of claim 14, wherein the DPF system is a distributed test framework system.

16. The method of claim 15, wherein the processing resources are a test system.

17. A method for distributing an execution of a plurality of tasks by a system controller, the plurality of tasks configured to be processed by a plurality of processing resources in a distributed processing framework (DPF) system, the method comprising:

loading the plurality of tasks, each of which includes instructions, to be executed;

allocating a respective processing resource of the plurality of processing resources to execute each task of the plurality of tasks before executing said instructions by searching a registry service for the processing resource having a plurality of attributes identical to a plurality of attributes of each task, and allocating each of the processing resources having a plurality of attributes identical to the plurality of each task for the execution of the task having the identical attributes;

deploying a first task of the plurality of tasks to a first processing resource of the plurality of processing resources;

deploying a second task of the plurality of tasks to a second processing resource of the plurality of processing resources upon receiving a result of an execution of the first task; and making the plurality of processing resources available for allocation of additional tasks upon receiving a result of execution for each of the plurality of tasks, wherein each processing resource is configured to be allocated to a respective task continuously until each of the instructions associated with said respective task is executed or one of the instructions associated with said respective task causes an execution of the task to discontinue.

18. The method of claim 17, further including, caching the result of the execution for each of the plurality of tasks.

19. The method of claim 17, wherein the registry service is a look up service.

20. The method of claim 17, wherein the DPF is a distributed test framework (DTF) system.

* * * * *